US012704088B2

(12) United States Patent
Merical et al.

(10) Patent No.: US 12,704,088 B2
(45) Date of Patent: Aug. 11, 2026

(54) PRE-CHAMBER COMBUSTION SYSTEMS AND METHODS

(71) Applicant: M2X Energy Inc., Rockledge, FL (US)

(72) Inventors: Kyle I. Merical, Winston-Salem, NC (US); Andrew Randolph, Salisbury, NC (US); John Anthony Dean, Scotia, NY (US); Paul E. Yelvington, Rockledge, FL (US); Joshua B. Browne, New York, NY (US)

(73) Assignee: M2X Energy Inc., Rockledge, FL (US)

( * ) Notice: Subject to any disclaimer, the term of this patent is extended or adjusted under 35 U.S.C. 154(b) by 38 days.

(21) Appl. No.: 17/984,126

(22) Filed: Nov. 9, 2022

(65) Prior Publication Data

US 2023/0279802 A1 Sep. 7, 2023

Related U.S. Application Data

(60) Provisional application No. 63/277,522, filed on Nov. 9, 2021.

(51) Int. Cl.
*F02B 19/10* (2006.01)
*F02B 19/12* (2006.01)
(Continued)

(52) U.S. Cl.
CPC .......... *F02B 19/12* (2013.01); *F02B 19/1052* (2013.01); *F02B 19/1061* (2013.01);
(Continued)

(58) Field of Classification Search
CPC .............. F02B 19/1028; F02B 19/1052; F02B 19/1061; F02B 19/1071; F02B 19/12; F02B 19/18; F02B 43/10; F02B 2043/103
(Continued)

(56) References Cited

U.S. PATENT DOCUMENTS 2,362,151 A 11/1944 Ostenberg
2,543,791 A 3/1951 Malin
(Continued)

FOREIGN PATENT DOCUMENTS

DE 102018220171 6/2010
EP 2606211 3/2013
(Continued)

OTHER PUBLICATIONS

Nov. 30, 2022, PCT, PCT/US2022/029707 Search and Opinion.
(Continued)

*Primary Examiner* — Erick R Solis
(74) *Attorney, Agent, or Firm* — Glen P. Belvis; Belvis Law, LLC.

(57) ABSTRACT

There are provided systems and methods for the use of rich limit extenders, and in particular pre-chamber assemblies, for increasing the ability of a spark-ignition engine to operate under fuel-rich conditions. In embodiments the pre-chamber assemblies are combined with spark-ignition engines as a reformer in a gas-to-liquid system for converting a combustible fuel source into synthesis gas. Embodiments of the reformers having pre-chambers provide a synthesis gas product having a $H_2$/CO ratio, with increased $H_2$ concentrations.

7 Claims, 18 Drawing Sheets

(51) Int. Cl.

*F02B 19/18* (2006.01)
*F02B 43/10* (2006.01)
*F02M 23/00* (2006.01)

(52) U.S. Cl.

CPC .......... *F02B 19/1071* (2013.01); *F02B 19/18* (2013.01); *F02B 43/10* (2013.01); *F02B 2043/103* (2013.01); *F02M 23/00* (2013.01)

(58) Field of Classification Search

USPC .................................... 123/3, 253–293, 527
See application file for complete search history.

(56) References Cited

U.S. PATENT DOCUMENTS

| | | | |
|---|---|---|---|
| 2,591,687 A | 4/1952 | Eastman | |
| 2,846,297 A | 8/1958 | Herwig | |
| 4,965,052 A | 10/1990 | Lowther | |
| 6,174,460 B1 | 1/2001 | Grunvald | |
| 7,367,183 B2 | 5/2008 | Eberspach | |
| 8,413,617 B2 | 4/2013 | Simpson | |
| 8,857,405 B2 | 10/2014 | Attard | |
| 9,151,212 B2 | 10/2015 | Dumser | |
| 9,169,773 B2 | 10/2015 | Bromberg | |
| 9,316,144 B2 | 4/2016 | Gruber | |
| 9,353,674 B2 | 5/2016 | Bunce | |
| 9,909,491 B2 | 3/2018 | Bromberg | |
| 10,465,631 B2 | 11/2019 | Lissianski | |
| 11,522,345 B2 * | 12/2022 | Conway | F02M 26/43 |
| 11,649,201 B2 | 5/2023 | Yelvington | |
| 11,649,777 B2 | 5/2023 | Capenter | |
| 11,674,484 B2 * | 6/2023 | Oehring | H02K 7/1823 166/66.4 |
| 2002/0131907 A1 | 9/2002 | Iwasaki | |
| 2005/0217178 A1 | 10/2005 | Aoyama | |
| 2007/0000472 A1 | 1/2007 | Gong | |
| 2010/0132660 A1 | 6/2010 | Nerheim | |
| 2010/0175379 A1 | 7/2010 | Liu | |
| 2011/0232589 A1 | 9/2011 | Blank | |
| 2011/0315096 A1 * | 12/2011 | Wilson | F01K 23/067 123/3 |
| 2012/0103302 A1 * | 5/2012 | Attard | F02B 19/10 123/260 |
| 2013/0160734 A1 | 6/2013 | Redtenbacher | |
| 2013/0220269 A1 * | 8/2013 | Woo | F02B 19/1085 123/260 |
| 2013/0233256 A1 * | 9/2013 | Schnepel | F02G 3/02 123/3 |
| 2013/0236371 A1 * | 9/2013 | Maslov | F02C 6/12 123/3 |
| 2014/0144397 A1 * | 5/2014 | Bromberg, III | C01B 13/0259 123/3 |
| 2015/0126628 A1 | 5/2015 | Patience | |
| 2016/0053668 A1 | 2/2016 | Loetz | |
| 2016/0131056 A1 * | 5/2016 | Henry | F02D 41/0052 60/274 |
| 2016/0152537 A1 | 6/2016 | Zubrin et al. | |
| 2016/0333830 A1 * | 11/2016 | Henry | F02M 26/01 |
| 2017/0009730 A1 * | 1/2017 | Kim | F02B 19/108 |
| 2017/0074184 A1 | 3/2017 | Kim | |
| 2017/0218727 A1 * | 8/2017 | Oehring | H02K 7/1823 |
| 2018/0066571 A1 * | 3/2018 | Boyde | F02B 19/1023 |
| 2018/0238247 A1 * | 8/2018 | Gukelberger | F02D 41/0065 |
| 2021/0130272 A1 | 5/2021 | Lepri | |
| 2021/0324785 A1 * | 10/2021 | Conway | H01T 13/32 |
| 2022/0388842 A1 | 12/2022 | Browne | |
| 2022/0401906 A1 | 12/2022 | Dean | |
| 2022/0403272 A1 | 12/2022 | Dean | |
| 2023/0212098 A1 | 7/2023 | Yelvington | |
| 2023/0279802 A1 | 9/2023 | Merical | |
| 2023/0286807 A1 | 9/2023 | Yelvington | |
| 2023/0340919 A1 | 10/2023 | Mercal | |
| 2024/0017235 A1 | 1/2024 | Yelvington | |
| 2024/0017993 A1 | 1/2024 | Dean | |
| 2024/0124377 A1 | 4/2024 | Yelvington | |

FOREIGN PATENT DOCUMENTS

| | | | | |
|---|---|---|---|---|
| JP | 06173823 A * | 6/1994 | F02B 19/12 |
| WO | WO-2011015329 A1 * | 2/2011 | F02B 19/1028 |
| WO | WO 2015138987 | 9/2015 | |

OTHER PUBLICATIONS

Nov. 4, 2022, PCT, PCT/US2022/029708 Search and Opinion.

Apr. 2016, Lim, et al, The Engine Reformer: Syngas Production in an Engine for Compact Gas-to-Liquids Synthesis; vol. 94, p. 623 (Canadian Journal of Chem Eng).

Feb. 2016, Medhat, et al, Frontiers in combustion techniques and burner designs for emissions control and CO2 capture: A review; Int J Energy Res 2019;1-.

Apr. 2015, Pederstad, et al, Improving utilization of associated gas in US tight oil fields (Carbon Limits AS).

(down loaded) 2022, Nissan, VC-Turbo Engine (https://www.nissan-global.com/EN/INNOVATION/TECHNOLOGY/ARCHIVE/VC_TURBO_ENGINE/).

Apr. 2016, Emmanuel, The Engine Reformer: Syngas Production in an Engine for Compact Gas-to-Liquids Synthesis.

Jun. 23, 2023, Third Party, Third Party submission in U.S. Appl. No. 17/746,927 (claims charts).

Jun. 23, 2023, Third Party, Third Party submission in U.S. Appl. No. 17/746,927 (List of References).

Jun. 2015, Lim, The Engine Reformer: Syngas Production in Engines Using Spark-Ignition and Metallic Foam Catalysts (pp. title-50).

Unknown, Unknown, Third Party submission in U.S. Appl. No. 17/746,927 (pp. 51-75).

Unknown, Unknown, Third Party submission in U.S. Appl. No. 17/746,927 (pp. 76-100).

Unknown, Unknown, Third Party submission in U.S. Appl. No. 17/746,927 (pp. 101-130).

Unknown, Unknown, Third Party submission in U.S. Appl. No. 17/746,927 (pp. 131-162).

Oct. 1, 1986, Chao, Thermodynamic Properties of Key Organic Oxygen Compounds in the Carbon Range C, to C, Part 2. Ideal Gas Properties.

1998, Chase, Journal of Physical and Chemical Reference Data Monograph No. 9 NIST-JANAF Thermochemical Tables Fourth Edition Part ,I Al-Co.

Jan. 2021, Methanol Institute, Innovation Outlook Renewable Methanol.

Mar. 2020, IEA, Reducing the environmental impact of oil and gas supply is a pivotal element of global energy transitions.

May 22, 2023, PCT, PCTUS2002/049446 Search Report.

May 22, 2023, PCT, PCTUS2002/049446 Opinion.

* cited by examiner

Global Warming Potential (GWP) Values Relative to $CO_2$

| Industrial Designation or Common Name | Chemical Formula | GWP Values for 100-Year Time Horizon | | |
|---|---|---|---|---|
| | | Second Assessment Report (SAR) | Fourth Assessment Report (AR4) | Fifth Assessment Report (AR5) |
| Carbon Dioxide | $Co_2$ | 1 | 1 | 1 |
| Methane | $CH_4$ | 21 | 25 | 28 |
| Nitrous Oxide | $N_2O$ | 310 | 298 | 265 |

FIG. 17

PRE-CHAMBER COMBUSTION SYSTEMS AND METHODS

This application claims under 35 U.S.C. § 119(e)(1) the benefit of the filing date of, and claims the benefit of priority to, U.S. provisional application Ser. No. 63/277,522 filed Nov. 9, 2021, the entire disclosure of which is incorporated herein by reference.

BACKGROUND OF THE INVENTION

Field of the Invention

The present inventions relate to new and improved methods, devices and systems for recovering and converting waste gases, such as flare gas, into useful and economically viable materials. In particular, embodiments of the present inventions relate to systems and methods for the rich fuel/air ignition of waste gases and syngas for partial oxidation to achieve predetermined $H_2$/CO ratios in the reaction products.

The term "flare gas" and similar such terms should be given their broadest possible meaning, and would include gas generated, created, associated or produced by or from oil and gas production, hydrocarbon wells (including conventional and unconventional wells), petrochemical processing, refining, landfills, wastewater treatment, dairies, livestock production, and other municipal, chemical and industrial processes. Thus, for example, flare gas would include stranded gas, associated gas, landfill gas, vented gas, biogas, digester gas, small-pocket gas, and remote gas.

Typically, the composition of flare gas is a mixture of different gases. The composition can depend upon the source of the flare gas. For instance, gases released during oil-gas production mainly contain natural gas. Natural gas is more than 90% methane ($CH_4$) with ethane and smaller amounts of other hydrocarbons, water, $N_2$ and $CO_2$ may also be present. Flare gas from refineries and other chemical or manufacturing operations typically can be a mixture of hydrocarbons and in some cases $H_2$. Landfill gas, biogas or digester gas typically can be a mixture of $CH_4$ and $CO_2$, as well as small amounts of other inert gases. In general, flare gas can contain one or more of the following gases: methane, ethane, propane, n-butane, isobutane, n-pentane, isopentane, n-hexane, ethylene, propylene, 1-butene, carbon monoxide, carbon dioxide, hydrogen sulfide, hydrogen, oxygen, nitrogen, and water.

The majority of flare gas is produced from smaller, individual point sources, such as a number of oil or gas wells in an oil field, a landfill, or a chemical plant. Prior to the present inventions flare gas, and in particular flare gas generated from hydrocarbon producing wells, and other smaller point sources, was burned to destroy it, in some instances may have been vented directly into the atmosphere. This flare gas could not be economically recovered and used. The burning or venting of flare gas, both from hydrocarbon production and other endeavors, raises serious concerns about pollution and the production greenhouse gases.

As used herein unless specified otherwise, the terms "syngas" and "synthesis gas" and similar such terms should be given their broadest possible meaning and would include gases having as their primary components a mixture of $H_2$ and CO; and may also contain $CO_2$, $N_2$, and water, as well as, small amounts of other materials.

As used herein unless specified otherwise, the term "product gas" and similar such terms should be given their broadest possible meaning and would include gases having $H_2$, CO and other hydrocarbons, and typically significant amounts of other hydrocarbons, such as methane.

As used herein unless specified otherwise, the term "reprocessed gas" includes "syngas", "synthesis gas" and "product gas".

As used herein unless specified otherwise, the terms "partial oxidation", "partially oxidizing" and similar such terms mean a chemical reaction where a sub-stoichiometric mixture of fuel and air (i.e., fuel-rich mixture) is partially reacted (e.g., combusted) to produce a syngas. The term partial oxidation includes both thermal partial oxidation (TPOX), which typically occurs in a non-catalytic reformer, and catalytic partial oxidation (CPOX). The general formula for a partial oxidation reaction is $$C_nH_m + \frac{n}{2}O_2 \longrightarrow {}_nCO + \frac{m}{2}H_2$$

As used herein unless specified otherwise, the recitation of ranges of values herein is merely intended to serve as a shorthand method of referring individually to each separate value falling within the range. Unless otherwise indicated herein, each individual value within a range is incorporated into the specification as if it were individually recited herein.

Generally, the term "about" as used herein unless stated otherwise is meant to encompass the larger of a variance or range of ±10%, or the experimental or instrument error associated with obtaining the stated value.

As used herein unless specified otherwise, the term "$CO_2e$" is used to define carbon dioxide equivalence of other, more potent greenhouse gases, to carbon dioxide (e.g., methane and nitrous oxide) on a global warming potential basis of 20 or 100 years, based on Intergovernmental Panel on Climate Change (IPCC) Fifth Assessment Report (AR5) methodology. The term "carbon intensity" is taken to mean the lifecycle $CO_2e$ generated per unit mass of a product.

As used herein, unless specified otherwise, the term "crude methanol" is defined as methanol produced in a methanol synthesis loop prior to the removal of water, dissolved gases, or other contaminants. Crude methanol often contains 5-20 wt % water, dissolved gases (e.g., 1-2 wt % $CO_2$) and trace contaminants (e.g., ethanol). As used herein, unless specified otherwise, the term "stabilized methanol" is defined as crude methanol that has passed through a flash operation (e.g., a single-stage flash drum) to reduce the concentration of dissolved gases and other light components. Often stabilized methanol will have <1% $CO_2$ and most typically about 0.5 wt % $CO_2$. As used herein, the terms "source methanol", "initial methanol", or similar terms refer to "crude methanol", "stabilized methanol" or both. As used herein, the term "grade methanol" is defined as methanol that meets a purity standard such as the ASTM AA standard (D1152) or IMPCA methanol reference specifications.

As used herein, unless specified otherwise, the terms % and mol % are used interchangeably and refer to the moles of a first component as a percentage of the moles of the total, e.g., formulation, mixture, material or product.

As used herein, unless stated otherwise, room temperature is 25° C., and standard temperature and pressure is 15° C. and 1 atmosphere (1.01325 bar). Unless expressly stated otherwise all tests, test results, physical properties, and values that are temperature dependent, pressure dependent, or both, are provided at standard temperature and pressure.

As used herein, unless stated otherwise, the terms "fuel-to-air equivalence ratio", "equivalence ratio", "fuel/air equivalence ratio", "@" or "ER", and similar such terms have the same meaning and are to be given their broadest meaning and would include the ratio of the actual fuel/air ratio to the stoichiometric fuel/air ratio. The stoichiometric air/fuel ratio is that need for ideal, stoichiometric combustion to occur, which is when all the fuel and oxygen is consumed in the reaction, and the products are carbon dioxide and water.

Global Warming and Environmental Concerns

The relative harm to the environment by the release of waste gases when compared to $CO_2$, an established highly problematic gas, are shown FIG. 17.

The environmental impact in terms of global warming potential of methane slippage from flare gas and venting cannot be overstated. According to a 2019 International Energy Agency (IEA) report, about 200 billion cubic meter (bcm) of waste or flare gas were combusted or vented into the atmosphere in 2018. About 50 bcm of gas were vented, and about 150 bcm were combusted in flares. Combustion is intended to convert hydrocarbons to $CO_2$, but their peak efficiency is 98%, and that efficiency drops in the presence of wind. The combination of inefficient combustion and venting results in total $CO_2e$ emissions of about 1.4 gigatons of $CO_2e$, which amounts to about 2.7% of all anthropogenic sources of $CO_2e$ per year.

This Background of the Invention section is intended to introduce various aspects of the art, which may be associated with embodiments of the present inventions. Thus, the forgoing discussion in this section provides a framework for better understanding the present inventions, and is not to be viewed as an admission of prior art.

SUMMARY

There has been a long-standing, expanding and unmet need, for systems, devices and methods to convert otherwise uneconomic hydrocarbon-based fuel (e.g., stranded, associated, non-associated, landfill, flared, small-pocket, remote gas, waste water treatment) to value-added, easily transported products (such as methanol, ethanol, mixed alcohols, ammonia, dimethyl-ether, F-T liquids, and other fuels or chemicals). The present inventions, among other things, solve these needs by providing the articles of manufacture, devices and processes taught, and disclosed herein.

For production of syngas via rich partial oxidation there is a desired fuel/air ratio to achieve a desired stoichiometry number, S, where $S=(H_2-CO_2)/(CO+CO_2)$ and $H_2$, CO, and $CO_2$ represent the molar amounts of each of those species. In the limiting case where the syngas does not contain $CO_2$, S reduces to the $H_2/CO$ ratio. Prior systems and methods for ignitability had serious and long-standing problems with slow flame propagation, which in turn dictated an undesirable rich operating limit in internal combustion engines and limited and prevented the economic achieving of the desired fuel/air ratio for the production of predetermined and optimal stoichiometry number S for syngas. The present inventions solve these long-standing problems through extending the rich combustion limit by adding a combustion pre-chamber with air injection to make the air-fuel mixture at point of ignition less rich. Air is admitted into this chamber either using a check valve or using an air injector. The pre-chamber communicates with the main combustion chamber via one or more of small orifices. As combustion in the pre-chamber proceeds, turbulent jets of hot gas exit these small orifices, promoting rapid combustion in the main chamber, which has a richer air/fuel ratio and provides a higher S of the exhaust product, which minimizes the need to adjust S before using the syngas for downstream synthesis of various products.

Thus, there is provided a reciprocating engine configured for operation under fuel rich conditions, the engine having: a main chamber; a rich limit extension means; the rich limit extension means in fluid communication with the main chamber, whereby a partially burned fuel-air mixture flows from the rich limit extension means to the main chamber; wherein the engine has a rich operating limit of an equivalence ratio of at least 1.5.

Yet further there is provided a method of converting a flare gas to a syngas using an engine having a main chamber and a pre-chamber, the method having: providing a flow of a fuel to a main chamber of an engine, wherein the fuel includes a flare gas; providing a flow of an oxidation source gas to a pre-chamber; flowing the flare gas into the pre-chamber through a plurality of holes connecting the main chamber and the pre-chamber; mixing the flare gas in the prechamber with the oxidation source gas in the prechamber, to thereby provide a mixture having an equivalence ratio that is less than that of the main chamber; igniting the mixture to provide a partially burned mixture and flowing the partially burned mixture into the main cylinder where it ignites the flare gas in the main chamber, to thereby produce a syngas; flowing the syngas out of the main chamber; wherein the engine is operated at a global equivalence ratio of at least 1.5.

In addition, there is provided a reciprocating engine configured for operation under fuel rich conditions, the engine having: a main chamber configured to operate at a main chamber equivalence ratio; a rich limit extension means; having a plurality of orifices; the rich limit extension means in fluid communication with the main chamber, whereby the orifices are configured to control a flow of fuel into rich limit extension means from the main chamber and a flow of a partially burned fuel-air mixture into the main chamber from the rich limit extension means; whereby, the rich limit extension means is configured to operate at has an equivalence ratio that is at least 10% less than the main chamber equivalence ratio; and, wherein the engine has a rich operating limit of at least 1.5.

There is still further provided these devices, engines and methods having one or more of the following features: wherein the rich operating limit is about 1.8 to 3.5; having a fuel source, which forms the partially burned fuel-air mixture; having a fuel source, which forms the partially burned fuel-air mixture, wherein the fuel source includes a combustible fuel; having a fuel source, which forms the partially burned fuel-air mixture, wherein the fuel source includes a flare gas; having a fuel source, which forms the partially burned fuel-air mixture, wherein the fuel source includes a pipeline-quality natural gas; having a fuel source, which forms the partially burned fuel-air mixture, wherein the fuel source consists essentially of a flare gas; wherein the rich limit extension means is configured to operate at an equivalence ratio equal to or less than that of the main chamber; wherein the rich limit extension means is configured to operate at an equivalence ratio equal to or less than that of the main chamber and the fuel source includes a flare gas; wherein the rich limit extension means is configured to operate at an equivalence ratio that is at least 10% less than the main chamber equivalence ratio; wherein the rich limit extension means is configured to operate at an equivalence ratio that is at least 30% less than the main chamber equivalence ratio; wherein the rich limit extension means is configured to operate at an equivalence ratio that is at least 80% less than the main chamber equivalence ratio; wherein the rich limit extension means is configured to operate at an equivalence ratio that is less than at least 10% of the main chamber equivalence ratio and the fuel source consists essentially of a flare gas; wherein the rich limit extension means is configured to operate at an equivalence ratio that is less than at least 30% of the main chamber equivalence ratio and the fuel source consists essentially of a flare gas; and, wherein the rich limit extension means is configured to operate at an equivalence ratio that is less than at least 80% of the main chamber equivalence ratio and the fuel source includes a flare gas.

Furthermore, there is provided a reciprocating engine configured for operation under fuel rich conditions, the engine having: a main chamber; a pre-chamber as rich limit extension means; the rich limit extension means in fluid communication with the main chamber, whereby a partially burned fuel-air mixture flows from the rich limit extension means to the main chamber; wherein the engine has a rich operating limit of an equivalence ratio of at least 1.5.

There is still further provide these devices, engines and methods having one or more of the following features: wherein the rich operating limit is about 1.8 to 3.5; wherein the rich limit extension means includes a pre-chamber body defining a pre-chamber; wherein the rich limit extension means includes a pre-chamber body defining a pre-chamber, and a passage for receiving a flow of an oxidation source gas; wherein the rich limit extension means includes: a pre-chamber body defining a pre-chamber; a passage for receiving a flow of an oxidation source gas; a nozzle, wherein the orifices are located in the nozzle; wherein the nozzle has from 16 to 20 orifices and one or more of the orifices has a jet cone angle of from 30° to 80°; wherein the nozzle has from 4 to 10 orifices and one or more of the orifices has a jet cone angle of from 40° to 60°; wherein the pre-chamber has an equivalence ratio of less than 1; wherein the engine has a rich operating limit of an equivalence ratio from about 1.8 to 2.5; and wherein the flow of fuel includes a flare gas.

Moreover, there is provided a device for extending the rich operating fuel limit of an engine, the device having: a body defining a pre-chamber cavity; an ignition source in communication with the pre-chamber cavity; an inlet conduit, wherein the inlet conduit has a first end configured for receiving an oxidation source gas and a second end configured to provide the oxidation source gas to the pre-chamber cavity; the pre-chamber cavity having a first end and a second end, wherein the second end has a nozzle having a plurality of holes; and, the body configured for attachment to an engine.

Furthermore, there is provided a reciprocating engine configured for operation under fuel rich conditions, the engine having: a main chamber; a pre-chamber as rich limit extension means; the rich limit extension means in fluid communication with the main chamber, whereby a partially burned fuel-air mixture flows from the rich limit extension means to the main chamber; wherein the engine has a rich operating limit of an equivalence ratio of at least 1.5.

Still further, there is provided these devices, methods and engines having one or more of the following features: wherein the inlet conduit has a check valve located between the first end and the second end; wherein the inlet conduit has an injector located between the first end and the second end; wherein the nozzle has 4 to 10 holes; wherein the nozzle has 4 to 10 holes and one or more of the holes has a jet cone angle of from 30° to 80°; wherein the nozzle has 4 to 10 holes and one or more of the holes has a diameter from 1.2 mm to 3 mm; wherein the nozzle has 4 to 10 holes and one or more of the holes has a diameter from 1.2 mm to 3 mm and one or more of the holes has a jet cone angle of from 40° to 60°; wherein the combined area of the holes is about 5% to about 60% of the area of the nozzle; where in the oxidation source gas includes air; where in the oxidation source gas includes air enriched with oxygen; wherein the global equivalence ratio is from about 1.5 to 3.5; wherein the syngas has a $H_2$ to CO ratio of at least 1.0; where in the rich limit extension means includes an ignition source; wherein the ignition source includes a spark plug; wherein the ignition source includes a plasma ignitor; wherein the ignition source includes a laser; wherein the ignition source includes an ignitable chemical; wherein the ignition source includes a chemical; wherein the ignition source is selected from the group consisting of a spark plug, a plasma ignitor, and a laser; wherein the pre-chamber includes an ignition source; and wherein the ignition source is selected from the group having a spark plug, a plasma ignitor, and a laser.

Moreover, there is provided methods and system for converting otherwise uneconomic hydrocarbon-based fuel (e.g., stranded, associated, landfill, flared, small-pocket, remote gas) to value-added, easily transported products (such as methanol, ethanol, mixed alcohols, ammonia, dimethyl-ether, F-T liquids, and other fuels or chemicals) using an combustion system having a pre-chamber, having leaner or less rich fuel/air ratio from added oxygen to the pre-chamber, in conjunction with an ignition chamber having a rich fuel/air ratio.

The fuel-air equivalence ratio in the main chamber under steady-state rich operation should be between 1.4 and 2.4 (target of 2.0), and between 0.8 and 1.5 (target of 1.2) in the combustion pre-chamber. These values of equivalence ratio have been shown to produce engine-out values of S greater than 1.2. The value of S can be further adjusted downstream of the engine to, for example, S greater than or equal to 2, which is ideal for methanol synthesis. Other downstream processes, for example production of mixed alcohols, require lower values of S and may not require syngas ratio adjustment.

Yet further there is provided a device and method to extend the fuel-rich operating envelope of an internal combustion to achieved desired syngas composition when using an engine as a reformer to produce synthesis gas (carbon monoxide and hydrogen).

Moreover, there is provided these methods, devices and engines having one or more of the following features: (1) $O_2$ enrichment of the inlet air stream to the reciprocating engine or $N_2$ rejection from the syngas stream via membrane separation or partial air separation unit; (2) recuperator heat exchanger and a turbo expander to recover energy from the high-pressure exhaust gas from the downstream synthesis reactor; (3) a recuperator heat exchanger associated with a combination of integrated heat exchangers, compression system components, and contaminant removal to prepare the syngas for the downstream synthesis reactors; (4) integration of a closed-loop control system, with custom instrumentation, to co-ordinate operation of syngas unit and the synthesis unit; (5) a cloud-based remote monitoring system, including Artificial Intelligence/Machine Learning ("AI/ML")-trained anomaly detection for dynamic preventative maintenance and operations control; and, (6) offtake pathways to utilize byproducts, such as nitrogen, water, and $CO_2$ for reinjection, well recompletions, or other purposes.

Yet further there is provided an engine having a pre-chamber in conjunction with a main chamber, the main chamber having an overall fuel/air equivalence ratio (ϕ or ER) greater than 1, greater than 1.5, greater than 2, greater than 3, from about 1.5 to about 4.0, about 1.1 to about 3.5, about 2 to about 4.5, and about 1.1 to about 3, and greater values. The pre-chamber having a leaner or less rich fuel/air equivalence ratio than the main chamber.

Moreover, there is provided a reciprocating engine having a pre-chamber in conjunction with at least on cylinder defining a main chamber, the main chamber having an overall fuel/air equivalence ratio (ϕ or ER) greater than 1, greater than 1.5, greater than 2, greater than 3, from about 1.5 to about 4.0, about 1.1 to about 3.5, about 2 to about 4.5, and about 1.1 to about 3, and greater values. The pre-chamber having a leaner or less rich fuel/air equivalence ratio than the main chamber.

Still further there is provided these engines and methods wherein the engine has 1, 2, 3, 4, 5, 6, 7, 8 or more cylinders defining main chambers, and one, more than one, and all of the main chambers have an ignition pre-chamber associated therewith.

Still further there is provided these engines and systems wherein the engine has 1, 2, 3, 4, 5, 6, 7, 8 or more cylinders defining main chambers, and wherein an ignition pre-chamber is shared with two or more of the main chambers.

Moreover, there is provided these engines further comprising a control system comprising a controller, a memory, and a processor having a closed-loop engine control strategy algorithm and method using such algorithm, including engine speed, spark timing and knock detection to handle variation in fuel properties, the algorithm and method having the following. An outer control loop sets parameters for steady operation and to achieve desired production of syngas: some parameters are fixed including the engine speed and the fully open throttle. In response to changes in external factors such as fuel composition and ambient temperature, self-adjusting calibration factors are varied to maintain constant engine power production (and thus engine speed), while the fuel-air ratio is maintained at a level to achieve desired $H_2/CO$ ratio and overall conversion to syngas. Engine speed is held constant while inlet parameters such as composition and density vary via valve timing, intake pressure (boost), and/or cylinder deactivation.

BRIEF DESCRIPTION OF THE DRAWINGS

FIG. 17 is a table showing global warming potential values.

DESCRIPTION OF THE PREFERRED EMBODIMENTS

The present inventions generally relate to systems, devices and methods to recover in an economical fashion usable fuels and chemicals from flare gas, and in particular, in an embodiment, to achieve such recovery at smaller, isolated or remote locations or point sources for the flare gas. In particular, the present inventions related to methods, devices and systems for extension of the rich operating limit of engines, including combustion pre-chambers and injectors.

In an embodiment of the present inventions there are provided embodiments that generally relate to operating a reciprocating engine at an overall rich equivalence ratio of 2+/−0.5 or greater using natural gas or low value gas, such as flare gas.

Figure 1:
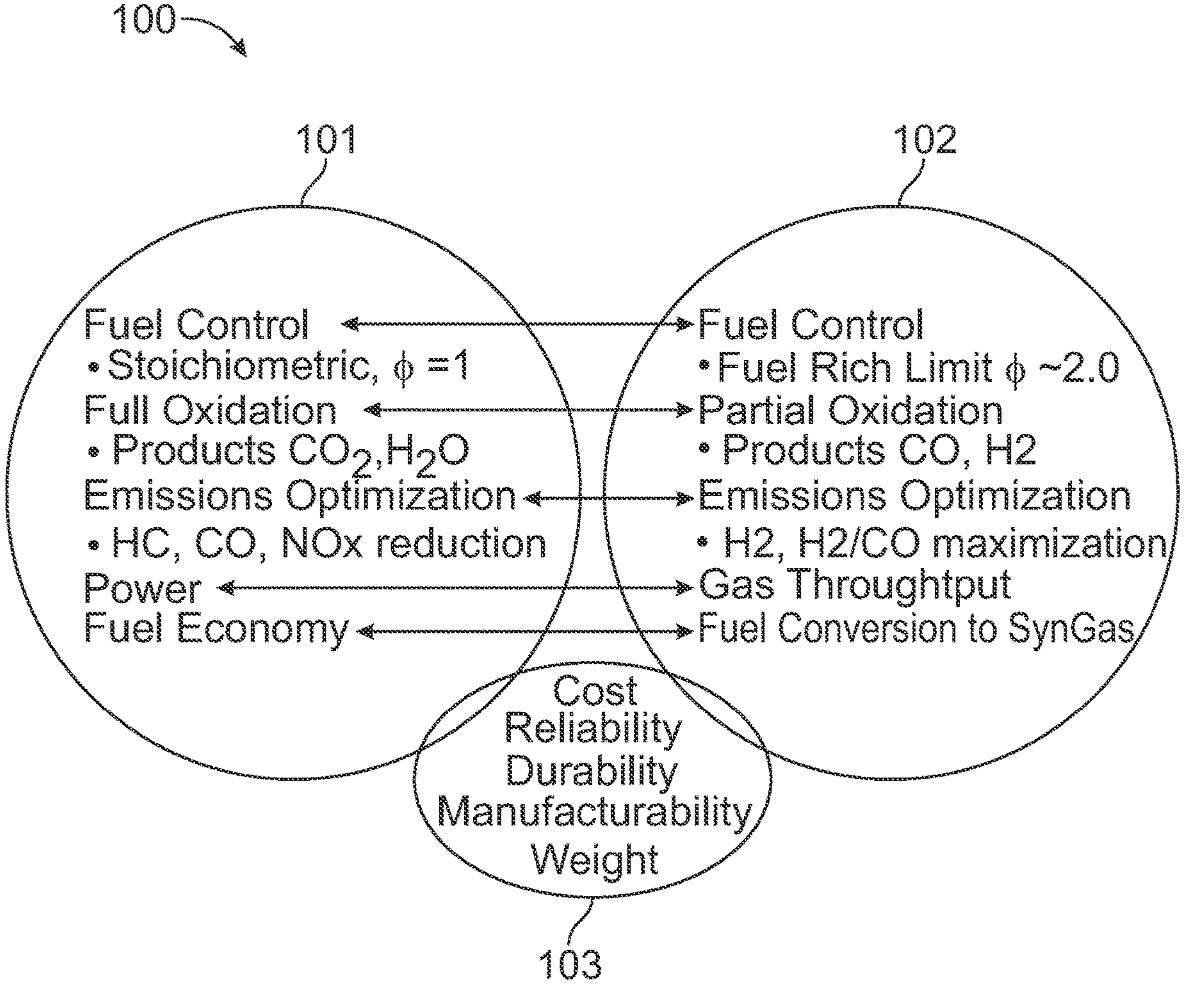
FIG. 1 is a Venn diagram illustrating examples of the benefits obtained by an embodiment of engine operation attributes in accordance with the present inventions.

In FIG. 1, there is shown a Venn diagram 100, showing examples of some of the improvements embodiments of the present inventions provide in flare gas recovery applications over prior operating conditions of spark ignition internal combustion engines. Thus, it is seen that typically operational attributes of a spark ignition internal combustion engine running rich, in accordance with embodiments of the present inventions, to produce synthesis gas (e.g., 102) differ significantly from conventional spark ignition engine attributes (e.g., 101). Conventional attributes such near complete oxidation, CO emissions minimization and power are replaced by partial fuel oxidation, $H_2$ and $H_2$/CO emissions maximization and gas throughput. The Venn diagram further shows the additional features and benefits of embodiments of the present inventions relating to operability and commercial embodiments (e.g., 103).

In general, embodiments of the present inventions take uneconomic hydrocarbon-based fuels at a wellhead and remote locations that are primarily gaseous hydrocarbons and convert them to a more valuable, easily condensable or liquid compounds, such as methanol. One source of a source fuel (i.e., waste gases) could be associated gas or flare gas, which is produced as a byproduct at oil wells. Another source could be biogas from landfill or anaerobic digesters.

Embodiments of the present inventions, in general, apply to modifications of conventional spark-ignition engines which, prior to these modifications, typically operate at a fuel-to-air equivalence ratio near 1.0 and in some cases operate at lower equivalence ratio near 0.5. Products of complete combustion of a hydrocarbon fuel at an equivalence ratio of 1.0, or lower, are primarily carbon dioxide and water. In embodiments of the present inventions, rich limit extension methods and devices, such as pre-chamber combustion devices, ignitors and combinations and variations of these, are used in conjunction with a conventional engine having a main combustion chamber, for operation at an increased fuel-to-air equivalence ratio (e.g., greater than 1, greater than about 1.5, greater than about 2), which produces a shortage of oxygen, leading to partially oxidized exhaust constituents such as carbon monoxide and hydrogen (e.g., synthesis gas ("syngas")). The precise, optimally rich fuel-to-air equivalence ratio is a function of the hydrogen-to-carbon ratio of the fuel, and other factors.

Figure 2:
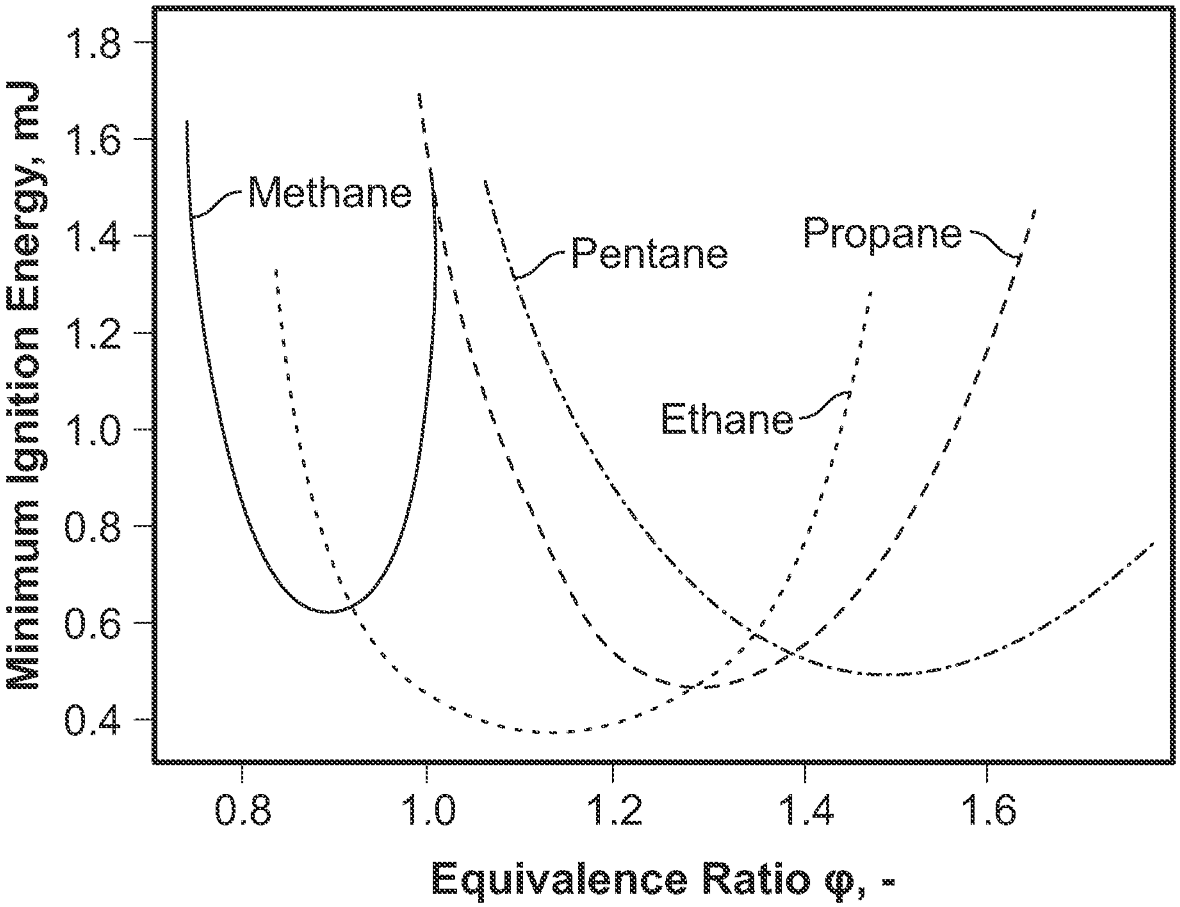
FIG. 2 is a chart showing embodiments of minimum ignition energy as a function of equivalence ratio for various hydrocarbons at ambient conditions.
Figure 3:
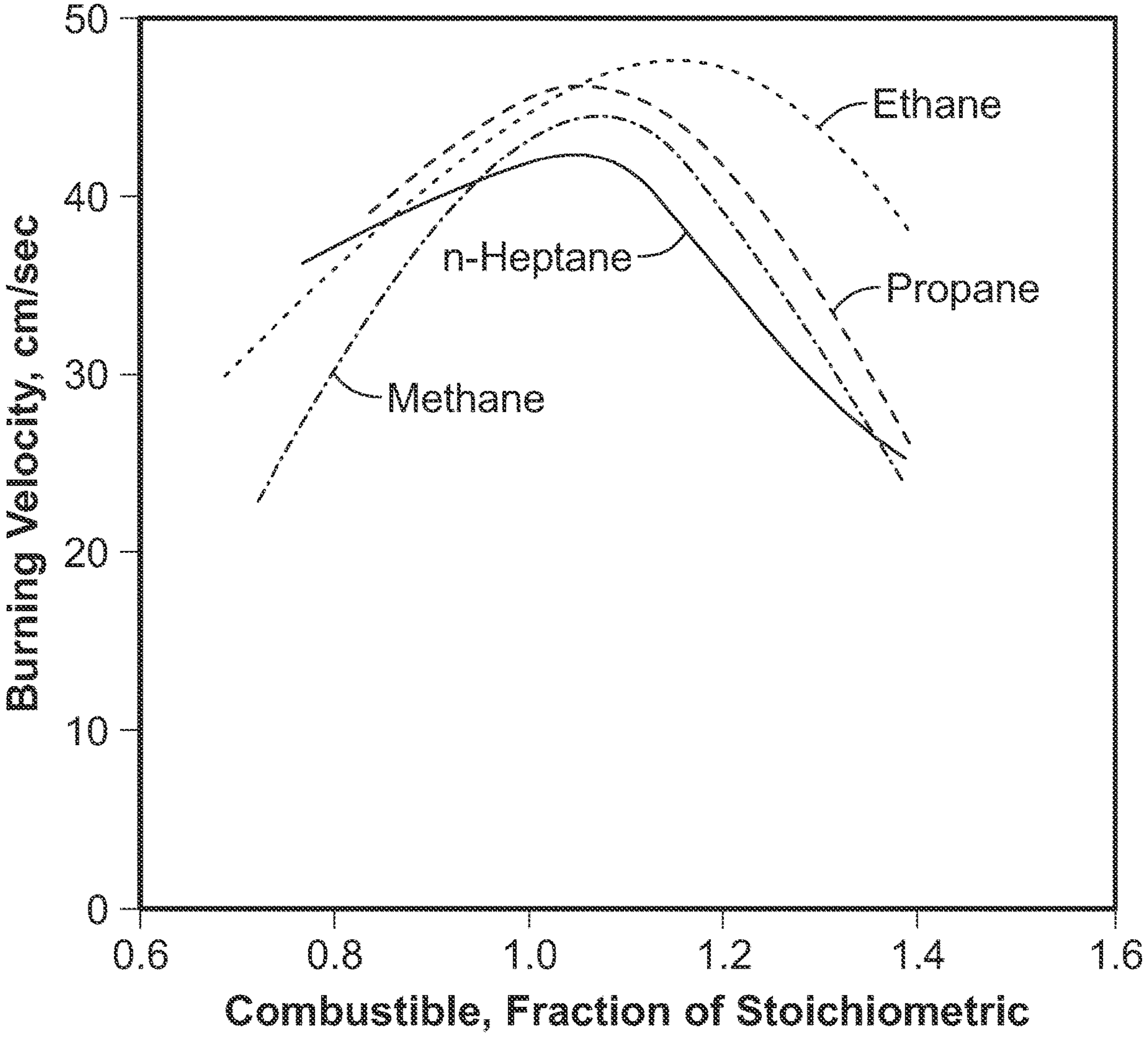
FIG. 3 is a chart showing embodiments of burning velocity of constituents of flare gas as a function of equivalence ratio.

Reactivity of fuel/air mixtures degrades at rich conditions resulting in ignition issues and lower flame propagation speed. FIG. 2 shows the minimum ignition energy increases quickly as equivalence ratio departs from 1 for various hydrocarbons at ambient conditions. In a similar manner, the burning velocity, or flame propagation velocity, also degrades quickly as equivalence ratio departs from 1 for various hydrocarbons at ambient conditions, as shown on FIG. 3. Thus, embodiments of the present engines and methods, address, among other things, the problems of stock commercial spark ignition engines, which suffering unacceptable combustion degradation well before reaching the optimally rich fuel-to-air equivalence ratio.

Figure 2A:
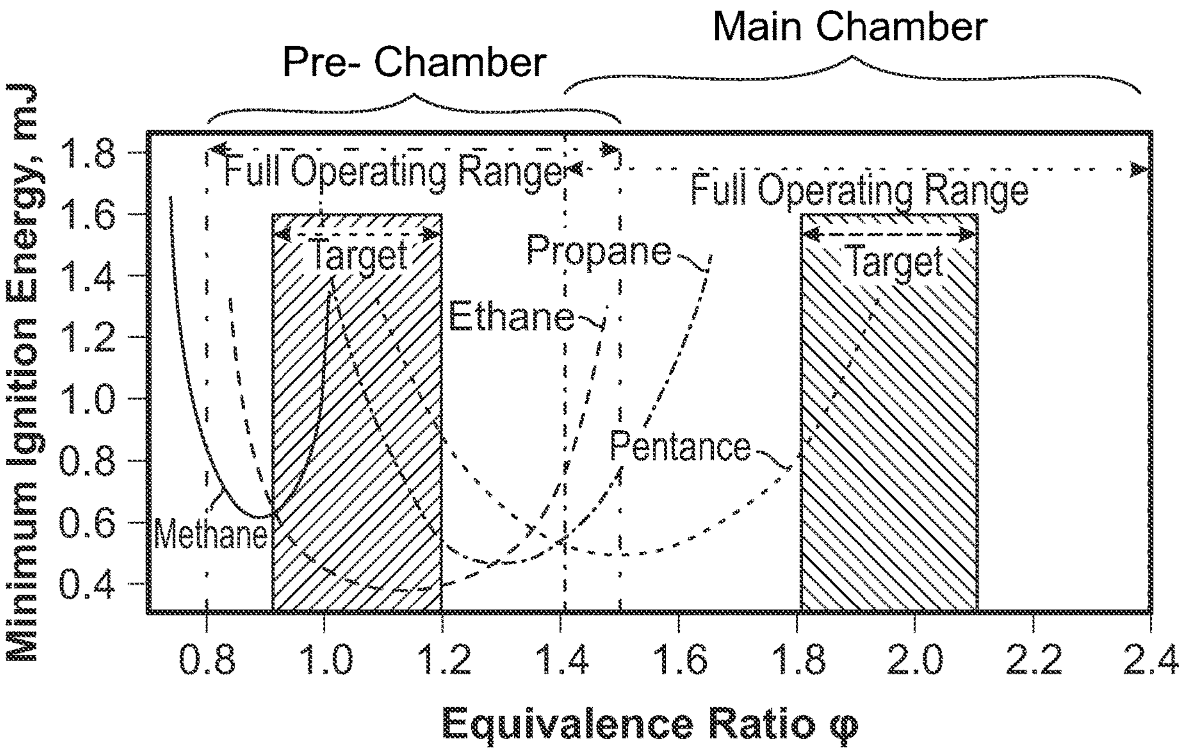
FIG. 2A is a chart showing embodiments of ignition energy as a function of equivalence ratio for various hydrocarbons at ambient conditions for use in pre-chamber and main chamber ignition in accordance with the present inventions.

Turning to FIG. 2A, there is shown an embodiment of preferred ranges for the operation of an embodiment of a pre-ignition chamber and an embodiment of a main chamber of the present engine configurations.

Flared natural gas at over 16,000 global well sites produces over 1.4 gigatons of $CO_2$ annually. An embodiment of the present invention utilizes that stranded, otherwise flared gas to produce economically viable, low-carbon chemicals and fuels such as methanol, hydrogen, and ammonia, thereby mitigating $CO_2$ emissions. For example, an embodiment of the present system is utilized for the conversion of flare gas to methanol at one or more or all, of the wellheads in an oil field having a large number of well heads.

Methanol, the simplest oxygenated hydrocarbon, is a foundational molecule that can be used for a wide variety of downstream chemicals and ultimately consumer products. Generally, the embodiments of the present pre-chamber-main-chamber engine configurations can be used as the reformer in a Gas-To-Liquids (GTL) system. Thus, the pre-chamber-main-chamber engine configurations are used to provide syngas, which is then converted to methanol. An embodiment of a wellhead Gas-To-Liquids ("GTL") system, e.g., a GTL conversion platform, produces crude methanol (e.g., nominally 10-15 wt % water, and may produce stabilized methanol, having reduced dissolved gases/lights (light hydrocarbon) from a single-stage flash operation at the wellhead. Thus, for example the GTL systems that utilized the present pre-chamber-main-chamber engine configurations can be of the types generally taught and disclosed in PCT patent applications serial numbers PCT/US2022/029708 and PCT/US2022/029707 and U.S. patent application Ser. Nos. 17/746,942, 17/746,937, 17/746,927, and 17/466,921, the entire disclosures of each of which are incorporated herein by reference.

The rich operating limit of a spark ignition engine is defined herein as the maximum fuel-to-air equivalence ratio at a given operating condition that produces no misfires and stable combustion (coefficient of variation ("COV") of indicated mean effective pressure ("IMEP")<5%).

The rich operating limit is dictated by the interaction of inlet conditions (e.g., fuel composition, throttle position, engine speed, environmental properties), engine design (e.g., compression ratio, valve timing, bore/stroke ratio, thermal properties), and ignition system design (e.g., energy delivery, charge stratification, and inlet processing).

In general, embodiments of the present inventions extend the rich operation limit with rich limit extension, such as an embodiment of the present pre-chamber ignition device. These pre-chamber ignition devices operate at a less-rich equivalence ratio that the main chamber of an engine, thereby increasing ignitability. The pre-chamber equivalence ratio in these pre-chamber devices can be at least 20% less, at least 30% less, at least 60% less, from about 25% to about 60% less, and larger and smaller values, of the ratio than is present in the main chamber of the engine. In embodiments, the pre-chamber can be operated at an equivalence ratio at least 0.8, at least 0.9, and up 1.2, up to 1.6, preferably not exceeding 1.6, but larger and smaller values may be used. For steady operation, the main chamber of the engine having a pre-chamber ignition device, can be operated at an equivalence ratio at least 1.4, at least 1.8, less than 2.1, less than 2.4, from 1.3 to 2.1, from 1.4 to 2.2, and preferably not exceeding 2.5, but larger and smaller values may be used.

Generally, in embodiments the pre-chamber preferably occupies less than 25% of the clearance volume of the engine with which it is associated. Similarly, in preferred embodiments packaging is optimized to increase ignition energy delivered to the main combustion chamber, while at the same time fit an existing or future engine design with minimal footprint and also to minimize the relatively lean pre-chamber's impact has on the "global" fuel-air ratio of the cylinder of the engine. As used in the context of the engine configurations, and in particular a pre-chamber main chamber configuration, the terms "global" and "globally" mean the fuel air equivalence ratio of the entire engine, including the pre and main combustion chambers. The pre-chamber can be integral to the cylinder head, or have a separate body that is attached to the cylinder head. The pre-chamber design facilitates spark kernel development with minimal quenching to the chamber walls of the pre-chamber, before partially burned air-fuel mixture enters the main combustion chamber. Active cooling of the pre-chamber is optional, and could be accomplished by directly connecting the coolant cavities in the cylinder head to the pre-chamber body, or by running external coolant hoses/pipes to the pre-chamber body.

In embodiments, the pre-chamber can have a supplemental source of an oxidizer (e.g., air) through an injection device (e.g., a check valve, an injector, a port, a valve). Thus, these embodiments have an additional air injection system. It is noted that oxygen or an oxygen contain gas other than, or in conjunction with, air can be used as this supplemental source the oxidizer, for use in these air injection systems. Further, the equivalence ratio in the pre-chamber can be made less rich by reducing the amount of fuel, in conjunction with or instead of adding an addition source of oxygen to the chamber.

Embodiments of the air injection system for the pre-chamber can use a passive valve, an air injector, and combination of these, and allows an oxidizer to enter the pre-chamber, to purge exhaust residuals and to flood the spark plug area with air, before the piston forces a portion of the rich mixture from the main chamber into the pre-chamber during the compression stroke. The air delivered from the air injector is also compressed by the piston and remains close to the spark plug, creating favorable conditions for spark kernel development.

The air injection embodiment that uses a check valve typically only opens to let air flow into the pre-chamber when the differential pressure across it allows. The spring that keeps the valve closed, along with air supply pressure are tuned so that the check valve only opens when air is needed in the pre-chamber.

The air injection system that consists of an electronically controlled air injector is only commanded to open at precise times to let a specific amount of fresh air into the pre-chamber.

The pre-chamber can be connected to the main chamber via one or more orifices, thus, placing the pre-chamber in fluid communication with the main chamber. There can be 1 or more, 4 or more, 6 or more, 8 or more, from 1 to 10, from 3 to 8, from 6 to 12 orifices. The orifices can be circular, oval, or other shapes. The orifices can have a throat that is cylindrical (i.e., parallel side walls), tapered toward the pre-chamber, tapered toward the main chamber, a dual taper (e.g., tapered toward both ends) and other configurations. The orifices connecting the pre-chamber and the main chamber can be all the same or have different features, e.g., diameters, throats, shapes. In general, the orifices facilitate, regulate, control, and combinations and variations of these, the flow of fuel from the main chamber into the pre-chamber for ignition in the pre-chamber and the flow of the partially burned air-fuel mixture from the pre-chamber to the main chamber. In a preferred embodiment the orifices are holes in a nozzle preferably located at the end of the pre-chamber away from the spark plug.

In embodiments a series of orifices in the pre-chamber allow the turbulent jets of partially burned air-fuel mixture to migrate from the pre-chamber to the main chamber. The turbulent jets reduce ignition delay time and increase overall flame propagation speed in the main chamber as they are dispersed and interact with the contents of the main chamber. The combined effective area of the orifices should be between 1% and 60% of the area of the pre-chamber body that passes through the firing face of the cylinder head (e.g., the area of the nozzle extending into the main chamber), to balance the accumulation of pressure in the pre-chamber before the contents migrate to the main combustion chamber. Thus, for example, the combined effective area of the orifices can be about 5%, about 10%, about 20%, about 30%, and about 45% of the area of the pre-chamber body that passes through the firing face of the cylinder head.

An embodiment of a passive pre-chamber contains only a spark plug inside the pre-chamber. This type of pre-chamber is filled with the same fuel-air mixture as the main combustion chamber. This system serves only to amplify the ignition energy delivered to the main chamber by converting the chemical energy contained in the fuel inside the pre-chamber into turbulent jets. The energy delivered to the main chamber by the turbulent jets is many times greater than that delivered by a conventional spark plug in the main chamber and is also more dispersed than a single ignition event from a conventional spark plug. The passive pre-chamber system greatly increases flame propagation speed in the main chamber, leading to lower in cylinder temperatures and less likelihood of knock.

An embodiment of an active pre-chamber arrangement includes a spark plug and an injector device used to impact the fuel-air ratio of the pre-chamber. An active pre-chamber is most beneficial for the conversion of flare gas to syngas, as the very fuel rich mixture in the main chamber is difficult to ignite and has low flame propagation speeds. An air injector inside the pre-chamber allows for more favorable ignition conditions at the spark plug than in the main chamber, as the air injected leans out the pre-chamber mixture and makes it closer to stoichiometry. Moreover, in embodiments the active pre-chamber systems maintain the benefits of passive pre-chambers, and have the added benefit of supplying a mixture that is more favorable for ignition in the vicinity of the spark plug. This is advantageous in many internal combustion engines that operate at very lean conditions in the main chamber, to reduce pumping work and thereby increase thermal efficiency.

Embodiments of the present pre-chamber, main-chamber engine configurations use an air injection device to enlean (i.e., make the fuel/air ratio leaner or less rich) the pre-chamber and assist in ignition of a globally fuel-rich mixture that will produce syngas when burned. Several prior-art pre-chamber variants are in use currently, but all of them operate either passively (air/fuel mixture compressed into the pre-chamber and subsequently ignited), or actively with either a fuel injector or a combination of fuel and air injection. Thus, the present configurations and methods of operation enlean the mixture in the pre-chamber as part of a strategy to operate an engine under extremely fuel rich conditions (equivalence ratio of at least 1.8).

In embodiments of the present invention, engines are a part of a modules, e.g., skid mounted, trailer mounted, truck mounted, etc., a reciprocating engine is used for processing the flair gas into syngas, which can then be further proceeded in methanol or other high value end products. The reciprocating engine has a control system configured for the processing of flair gas to syngas.

Generally, traditional engine control and operability is challenged by the rich fuel-air mixtures preferably used to produce syngas with a preferred $H_2/CO$ ratio. For embodiments of the present systems and methods for syngas production, the fuel-air mixture in the main chamber is rich, preferably having an overall fuel/air equivalence ratio (or ER) greater than 1, greater than 1.5, greater than 2, greater than 3, from about 1.5 to about 4.0, about 1.1 to about 3.5, about 2 to about 4.5, and about 1.1 to about 3, and greater values.

In embodiments of the present engine configurations, the engines utilize a control system that can include feedforward and feedback approaches; a physics-based engine model; a lambda sensor ($O_2$-based sensor); sensors with intermittent contact with the flare gas, the syngas or both streams; and combinations and variations of these. PCT patent application no. PCT/US2022/029708 and U.S. patent application Ser. No. 17/746,927 disclose and teach embodiments of control systems that can be used with the present pre-chamber, main chamber engine configurations, the entire disclosure of each of which are incorporated herein by reference.

EXAMPLES

The following examples are provided to illustrate various embodiments of the present waste gas conversion processes and systems. These examples are provided to illustrate various embodiments of the present rich limit extenders and conventional engines having these rich limit extenders for operation at rich and extremely rich equivalence ratios. A preferred use and embodiment of the following examples is as a reformer in a GTL system to convert flare gas to syngas. These examples are for illustrative purposes, may be prophetic, and should not be viewed as, and do not otherwise limit the scope of the present inventions. It should also be understood that the rich limit extenders, e.g., pre-chamber ignitors, injectors and the like, of one example can be used with any type of spark ignition engine, in addition to the spark ignition engine shown in a particular example. Further the configuration of a particular component of any one example may be used in the configuration of another example.

Example 1

Figure 4:
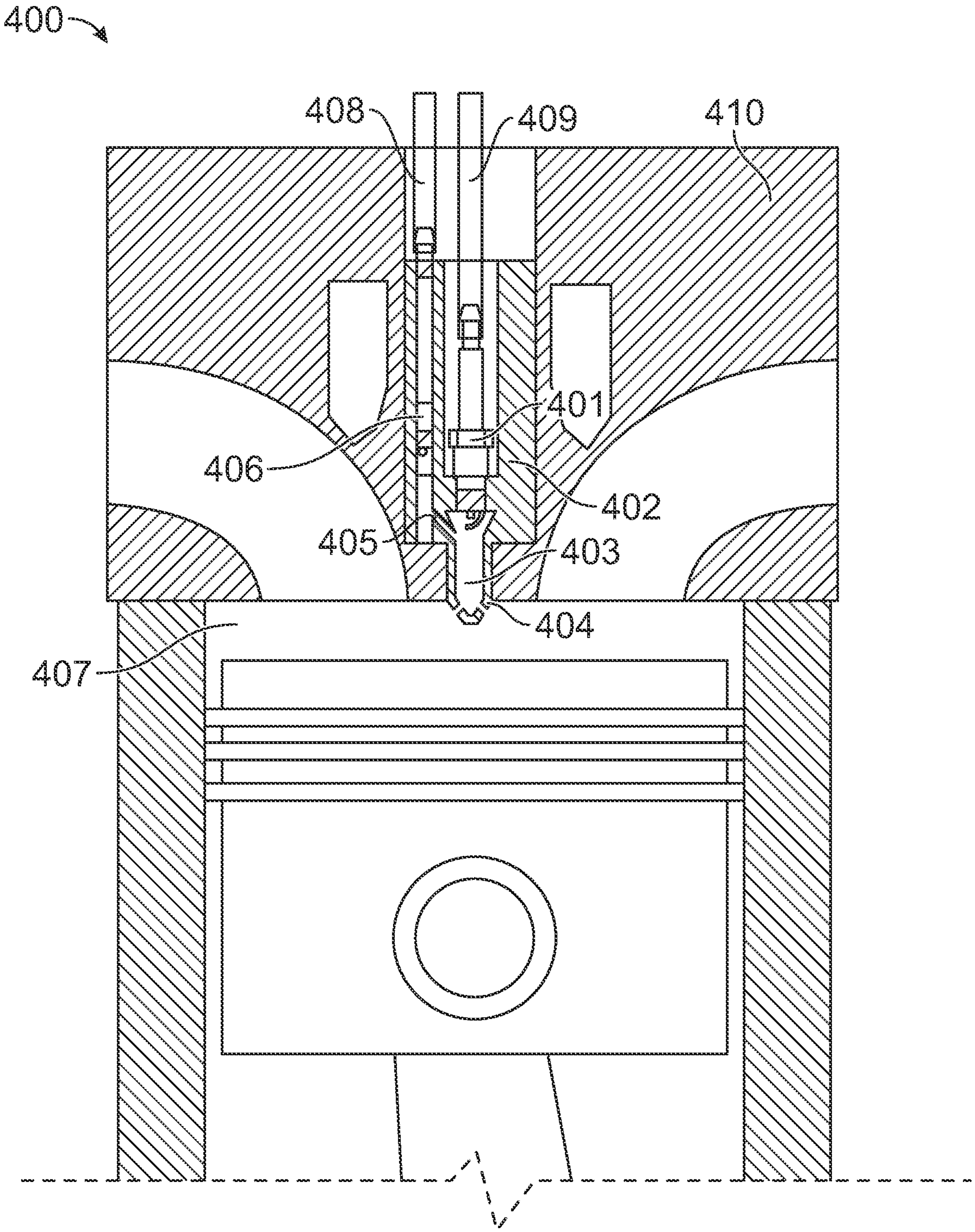
FIG. 4 is a cross-sectional view of an embodiment of an engine with a pre-chamber assembly in accordance with the present inventions.
Figure 5:
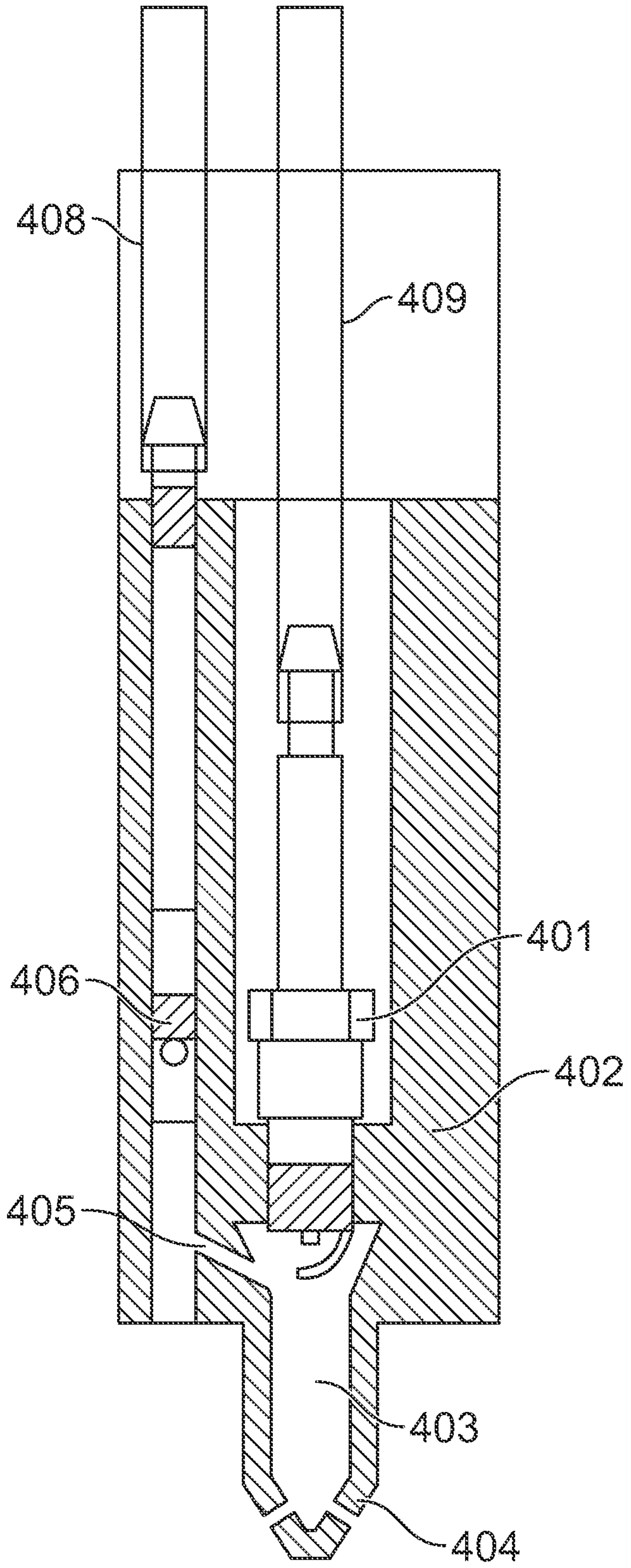
FIG. 5 is a cross-sectional view of an embodiment of a pre-chamber assembly for use with an engine in accordance with the present inventions.

Turning to FIGS. 4 and 5, there is shown cross sections of an engine configuration 400 having a pre-ignition chamber 403 and a main chamber 407. FIG. 5 is an enlargement of the pre-chamber ignitor body 402. The pre-chamber ignitor 403 is formed in the pre-chamber body 402 and has spark plug 401. The nozzle orifice 404 connects the pre-chamber 403 with the main chamber 407. Passage 405 extends through the chamber body 402 and connects the pre-chamber 403 with a check valve 406 that is on conduit 408. The assembly of passage 405, check valve 406 and conduit 408 provide a system to add additional oxidation source gases, e.g., air, oxygen, combination of these, into the pre-ignition chamber 403. The pre-chamber body 402 is part of the cylinder head 410 for the engine configuration 400. A spark plug wire 409 is connect to the spark plug 401 and to an electrical source which is not shown. This configuration extends the rich operating limit towards the optimally rich fuel-to-air equivalence ratio, thereby providing a way for producing synthesis gas using spark ignition engines.

In operation, air enters the system 400 through hose or pipe 408 and passes through the check valve 406. Air exits the check valve 406 and flows through a passage 405 to enter the pre-chamber 403. After ignition in the pre-chamber 403, the partially combusted pre-chamber contents flow into the main chamber 407, via nozzle orifices 404 (e.g., the nozzle holes).

As shown in FIG. 4, the pre-chamber body is installed in, or is a part of, the cylinder head 410. In this embodiment, for example, the pre-chamber body, for example, can be threaded into, formed as an integral part of, welded into, squeeze fit into, etc., the cylinder head. The pre-chamber can also be a separate body, or installed in a separate body, from the cylinder head 410, and this separate body would preferably be attached to, or joined with, the cylinder head 410. The pre-chamber assembly can be installed at any angle with respect to the cylinder head.

Example 2

A method to modify a conventional engine to achieve extended rich operation limit include:

installation of an ignition pre-chamber that contains the spark plug and an air injection device;

control of the amount of air injected via either a check valve or an active air injector; and, adoption of one or more orifices that connect the pre-chamber to the main combustion chamber.

Example 3

Figure 6:
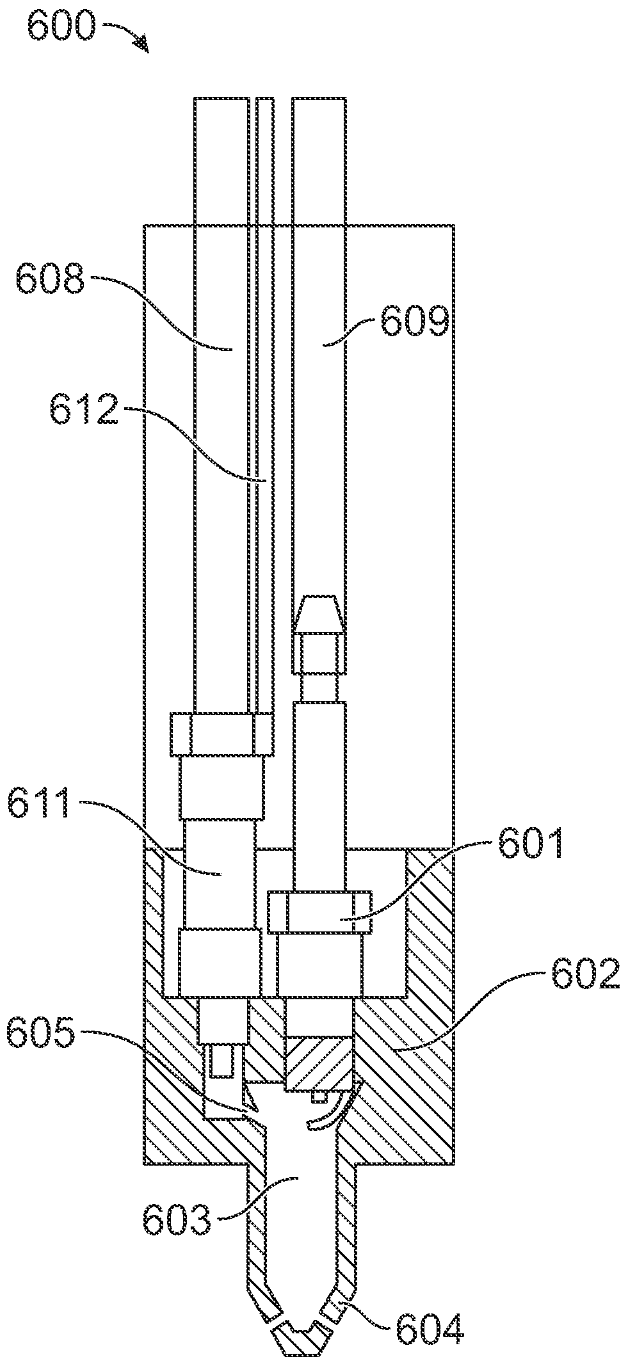
FIG. 6 is a cross-sectional view of an embodiment of a pre-chamber assembly for use with an engine in accordance with the present inventions.

Turning to FIG. 6, there is shown a cross section of pre-assembly 600, having a pre-chamber 603 and a pre-chamber body 602. The pre-chamber 603 is formed in the pre-chamber body 602 and has spark plug 601. The nozzle orifice 604 (e.g., the nozzle holes) connects the pre-chamber 603 with the main chamber of a spark ignition engine (not shown).

The pre-chamber assembly 600 can be installed in, or is a part of, the cylinder head. In this embodiment, for example, the pre-chamber assembly 600 and more preferably the pre-chamber body 602, for example, can be threaded into, formed as an integral part of, welded into, squeeze fit into, etc., the cylinder head. The pre-chamber assembly 600 can also be a separate body, or installed in a separate body, from the cylinder head, and this separate body would preferably be attached to, or joined with, the cylinder head. The pre-chamber assembly can be installed at any angle with respect to the cylinder head.

Passage 605 extends through the pre-chamber body 602 and connects the pre-chamber 603 with an injector 611 that is attached to conduit 608. The assembly of passage 605, injector 611 and conduit 608 provide a system to add, e.g., inject, additional oxidation source gases, e.g., air, oxygen, combination of these, into the pre-ignition chamber 603. A spark plug wire 609 is connect to the spark plug 601 and to an electrical source which is not shown. This assembly 600 extends the rich operating limit of an engine towards the optimally rich fuel-to-air equivalence ratio, thereby providing a way for producing synthesis gas using spark ignition engines.

In operation, when the assembly 600 is used as a part of an engine, air enters the system 600 through hose or pipe 608 and passes through the injector 611. Air exits the injector 611 and flows through a passage 605 to enter the pre-chamber 603. After ignition, in the pre-chamber 603, the partially combusted pre-chamber contents flow into the main chamber of an engine (not shown), via nozzle orifices 604.

Example 4

A embodiment of this invention revolves around a rich-burn reciprocating engine and a synthesis reactor. The rich-burn reciprocating engine has a pre-chamber that is in fluid communication with a main chamber that is contained in a reciprocating engine cylinder head. Unlike a traditional reciprocating engine, the pre-chamber runs at fuel-lean conditions with added oxygen for an oxygen source, e.g., air, that then has the ignited fuel from the pre-chamber entering the main-chamber and assisting, causing or both, the ignition of the fuel in the main chamber. In this manner the engine runs at fuel-rich conditions, e.g., up to equivalence ratio of 2.5, so the fuel experiences rich partial oxidation (POX) in the main chamber. Additional components can include the fuel conditioning system, heat exchangers, compressors, and synthesis reactor. The fuel conditioning system separates liquids from gases in the feed stream and removes compounds that can damage the reciprocating engine or synthesis reactor. The heat exchangers and compressors take the syngas mixture at the exit of the reciprocating engine and adjust the temperature and pressure to deliver the target conditions for the synthesis reactor. Within the synthesis sub-system is an $H_2$ recycle loop or $CO_2$ scrubber for syngas ratio adjustment. Optionally, the gas at the exit of the synthesis processes is heated in a recuperating (e.g., counter-flow) heat exchanger to an elevated temperature and then expanded to ambient pressure, thus providing shaft work for compression of the synthesis gas.

Example 5

There is provided an embodiment of these engines having pre-chambers and main chambers that have a control strategy for starting an engine and subsequent transitioning to full load, full rich operation. This process and strategy can be implemented by control programs (e.g., an algorithm), in a control system having a controller (e.g., input/output ("I/O"), processor and memory).

Engine start will be at nearly-closed throttle with a stoichiometric air/fuel ratio as is standard in most spark ignited engines. Stoichiometry is established in the calibration (open loop control) and fine-tuned using feedback from the Lambda sensor to an equivalence ratio of 1.0. Air will not be injected into the pre-chamber during stoichiometric operation. In the case that a check valve is used to meter air to the pre-chamber, a solenoid installed between the check valve and air source will be closed when running the engine at stoichiometric conditions to prevent pre-chamber enleanment. Ignition timing is typically retarded significantly from MBT (Minimum spark advance for Best Torque) in this operating mode, and will remain retarded from MBT to provide a rapidly-varied means of transient engine speed/load control (as discussed above).

After roughly three minutes of operation at idle speed and load, the throttle will open until the desired operating engine speed is attained.

As load is applied slowly (through the generator and/or load bank), speed is maintained by opening the throttle further. The fuel-air equivalence ratio is also slowly enriched during this time.

Once the throttle is open fully, speed is maintained while further increasing load by increasing intake boost (increasing intake pressure). The fuel-air mixture is further enriched during this time. The solenoid that controls the supply of air to the pre-chamber check valve is opened as the engine fuel-air equivalence ratio is increased.

The engine is allowed to stabilize after full boost and enrichment targets are achieved. First generator load (rough adjustments) and then spark timing (fine adjustments) is used to hold engine speed constant. Remaining margin between steady-state spark timing and spark timing limits is used for disturbance rejection in this steady-state speed control mode. The pre-chamber air supply check valve remains open when operating in this fully enriched mode.

Example 6

Figure 7:
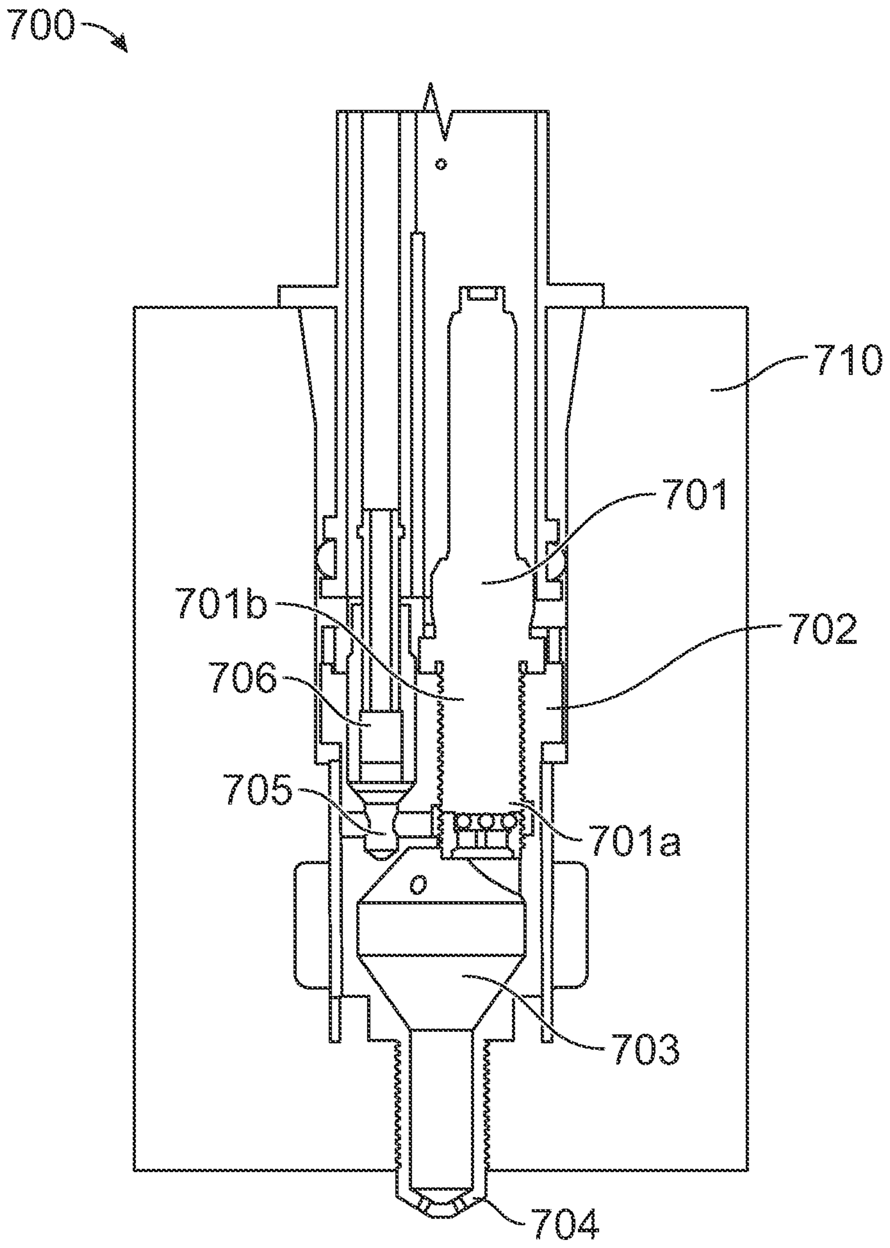
FIG. 7 is a cross-sectional view of an embodiment of a pre-chamber assembly for use with an engine in accordance with the present inventions.

Turning to FIG. 7, there is shown a cross section of pre-chamber assembly 700, having a pre-chamber 703 and a pre-chamber body 702. The pre-chamber 703 is formed in the pre-chamber body 702 and has spark plug 701. The pre-chamber body 702 is located in a cylinder head 710. The nozzle orifice 704 (e.g., the nozzle holes) connects the pre-chamber 703 with the main chamber of a spark ignition engine (not shown).

The pre-chamber assembly 700 can be installed in, or is a part of, the cylinder head. In this embodiment, for example, the preassembly and more preferably the pre-chamber body 702, for example, can be threaded into, formed as an integral part of, welded into, squeeze fit into, etc., the cylinder head. The pre-chamber assembly can also be a separate body, or installed in a separate body, from the cylinder head, and this separate body would preferably be attached to, or joined with, the cylinder head. The pre-chamber assembly can be installed at any angle with respect to the cylinder head.

The shape of the pre-chamber 703 has an upper conical section, into which the spark plug is located, a central circular section and then a lower conical section that connects to the nozzle. In this embodiment the spark plug is positioned off center (off axis) from the pre-chamber axis. The spark plug can also be located on axis.

In this assembly 700, holes 701*a* are drilled or otherwise formed in the sides of the spark plug shell 701*b*, which allow the air injected to travel through passage 705 and then through the spark plug shell 701*b*. This allows for more complete scavenging of residual exhaust gases from around the spark plug, as well as a more fuel lean mixture near the spark plug, both of which are beneficial for combustion.

Housing the spark plug 701 in the pre-chamber body 702 allows for more favorable conditions for ignition at the spark plug, which allows the mixture to light with less electrical energy delivered to the spark plug. This extends spark plug life.

Passage 705 extends through the chamber body 702 and connects the pre-chamber 703 with a valve 706, e.g., a check valve, that is attached to conduit. The assembly of passage 705, valve 706 and conduit provide a system to add additional oxidation source gases, e.g., air, oxygen, combination of these, into the pre-chamber 703. A spark plug wire is connected to the spark plug 701 and to an electrical source which is not shown. This assembly 700 extends the rich operating limit of an engine towards the optimally rich fuel-to-air equivalence ratio, thereby providing a way for producing synthesis gas using spark ignition engines.

In operation, when the assembly 700 is used as a part of an engine, air enters the system 700 through hose or pipe and passes through the valve 706. Air exits the valve and flows through a passage 705 to enter the pre-chamber 703. After ignition, in the pre-chamber 703, the partially combusted pre-chamber contents flow into the main chamber of an engine (not shown), via nozzle orifices 704.

Example 7

Figure 8:
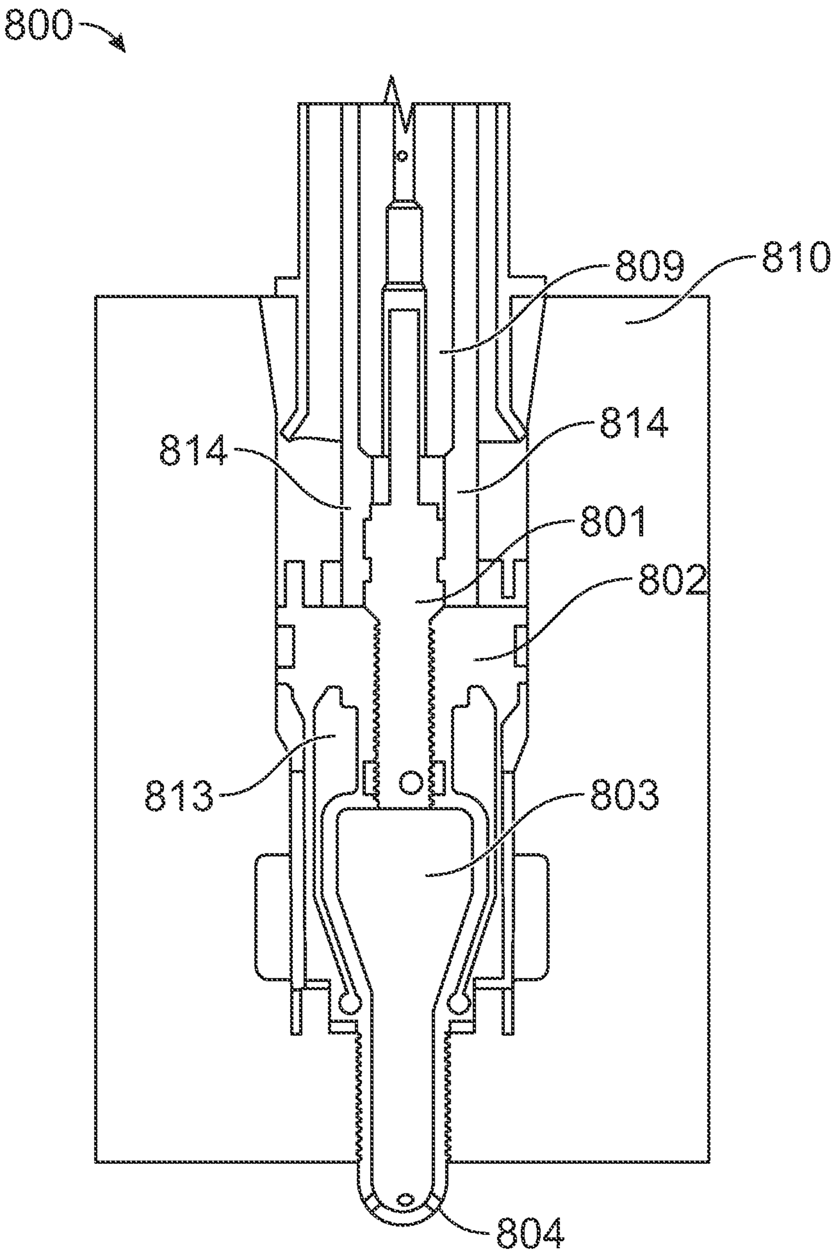
FIG. 8 is a cross-sectional view of an embodiment of a pre-chamber assembly for use with an engine in accordance with the present inventions.

Turning to FIG. 8, there is shown a cross section of pre-chamber assembly 800, having a pre-chamber 803 and a pre-chamber body 802, which is installed into a cylinder head 810 of a spark ignition engine. The pre-chamber 803 is formed in the pre-chamber body 802 and has spark plug 801. The nozzle orifice 804 (e.g., the nozzle holes) connects the pre-chamber 803 with the main chamber of a spark ignition engine.

The pre-chamber assembly 800 can be installed in, or is a part of, the cylinder head 810. In this embodiment, for example, the pre-chamber assembly 800 and more preferably the pre-chamber body 802, for example, can be threaded into, formed as an integral part of, welded into, squeeze fit into, etc., the cylinder head. The pre-chamber assembly 800 can also be a separate body, or installed in a separate body, from the cylinder head, and this separate body would preferably be attached to, or joined with, the cylinder head. The pre-chamber assembly can be installed at any angle with respect to the cylinder head.

The embodiment of FIG. 8 has internal coolant passages 813, to actively cool the pre-chamber 803. This coolant is fed in and out of external tubes 814, but could also use coolant flowing from an opening in the cylinder head to internal or external passages in the pre-chamber body 802. The pre-chamber coolant can be shared with the rest of the engine or be contained in its own system. The pre-chamber coolant serves to extend the life of the pre-chamber itself, as well as the components installed within and near it, such as the spark plug 801, by controlling their temperatures.

This assembly 800 can have holes drilled in the sides of the spark plug shell 8, which allow the air injected to travel through passage and then through the spark plug shell. Where holes in the spark plug shell are not used, the passage will flow the air to the pre-chamber, as shown in Example 1.

The shape of the pre-chamber 803 has an upper circular section into which the spark plug is located and a lower conical section that connects to the nozzle. In this embodiment the spark plug is positioned on the axis of the chamber. The spark plug can also be located off axis.

Although not shown in FIG. 8, in this assembly 800 there is a passage that extends through the chamber body 802 and connects the pre-chamber 803 through a flow control device, e.g., a valve, a check valve or an injector. The assembly of the passage, flow control device and conduit provide a system to add additional oxidation source gases, e.g., air, oxygen, combination of these, into the pre-chamber 803. A spark plug wire 809 is connect to the spark plug 801 and to an electrical source which is not shown. This assembly 800 extends the rich operating limit of an engine towards the optimally rich fuel-to-air equivalence ratio, thereby providing a way for producing synthesis gas using spark ignition engines.

In operation, when the assembly 800 is used as a part of an engine, air enters the system 800 through a hose or pipe and passes through the system to add additional oxidation source gas and enters into the pre-chamber 803. After ignition, in the pre-chamber 803, the partially combusted pre-chamber contents flow into the main chamber (not shown) of an engine, via nozzle orifices 804.

Example 8

Perspective and cross-sectional views (respectively) of embodiments of various nozzle configurations and nozzle openings are shown in FIGS. 9, 9A, and 10, 10A. These nozzle and opening configurations, as well as, configurations having more or less and larger and smaller openings can be used with any of the embodiments of pre-chambers, including the Examples.

Figure 9:
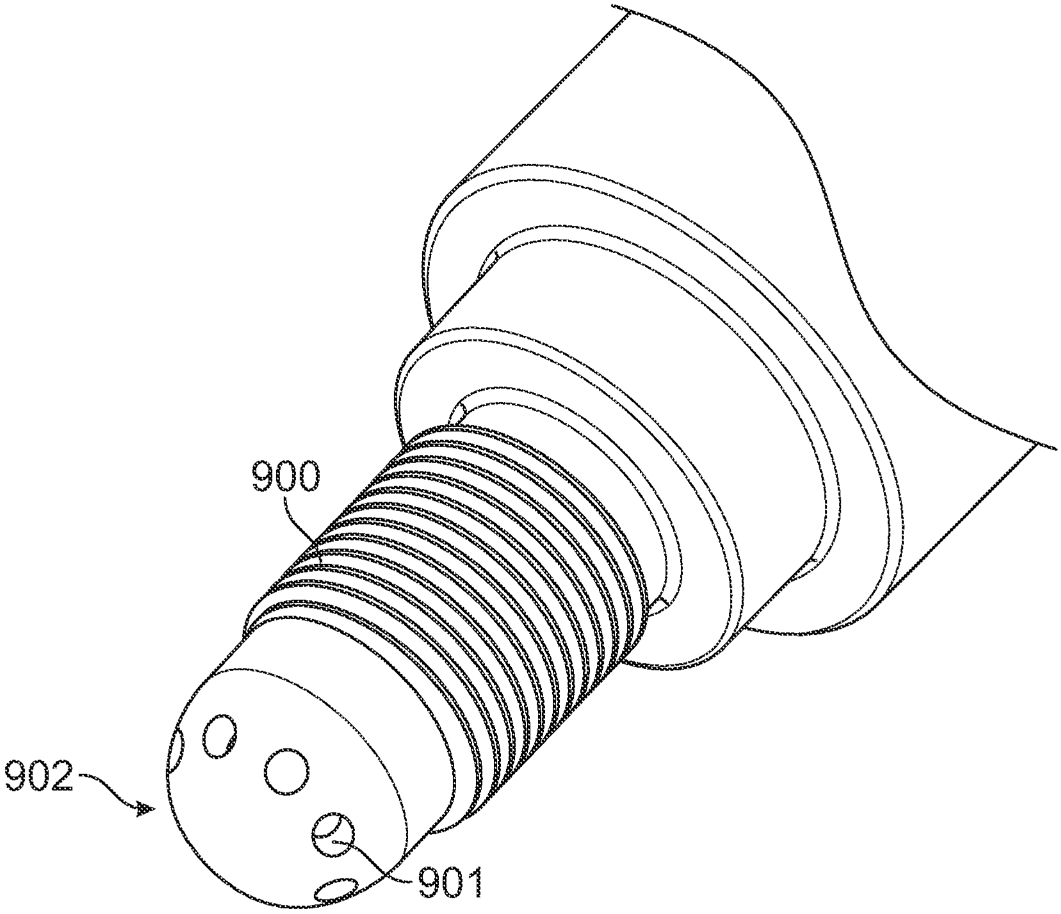
FIG. 9 is a perspective view of an embodiment of a nozzle to use in embodiments of pre-chamber assemblies in accordance with the present inventions.
Figure 9A:
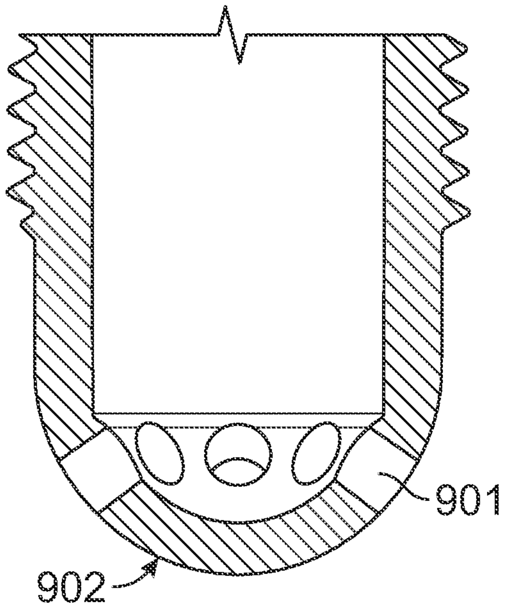
FIG. 9A is a cross-sectional view of the nozzle of FIG. 9

In FIGS. 9 and 9A there is shown a prospective view and cross-sectional view (respectively) of a nozzle 900, the nozzle has an orifice that is made up of 8 nozzle holes, e.g., 901, located around the end or tip 902 of the nozzle. The holes have a diameter of 2 mm. The diameter of the holes can be about 2 mm, about 2.2 mm, about 2.3 mm, about 2.7 mm, and can be from 2 mm to 2.8 mm in diameter. Depending upon the size and shape of the nozzle, and number of holes in the nozzle, larger diameter holes may be used. Smaller diameter holes may also be used. The holes all be the same diameter or they can be different diameters.

Figure 10:
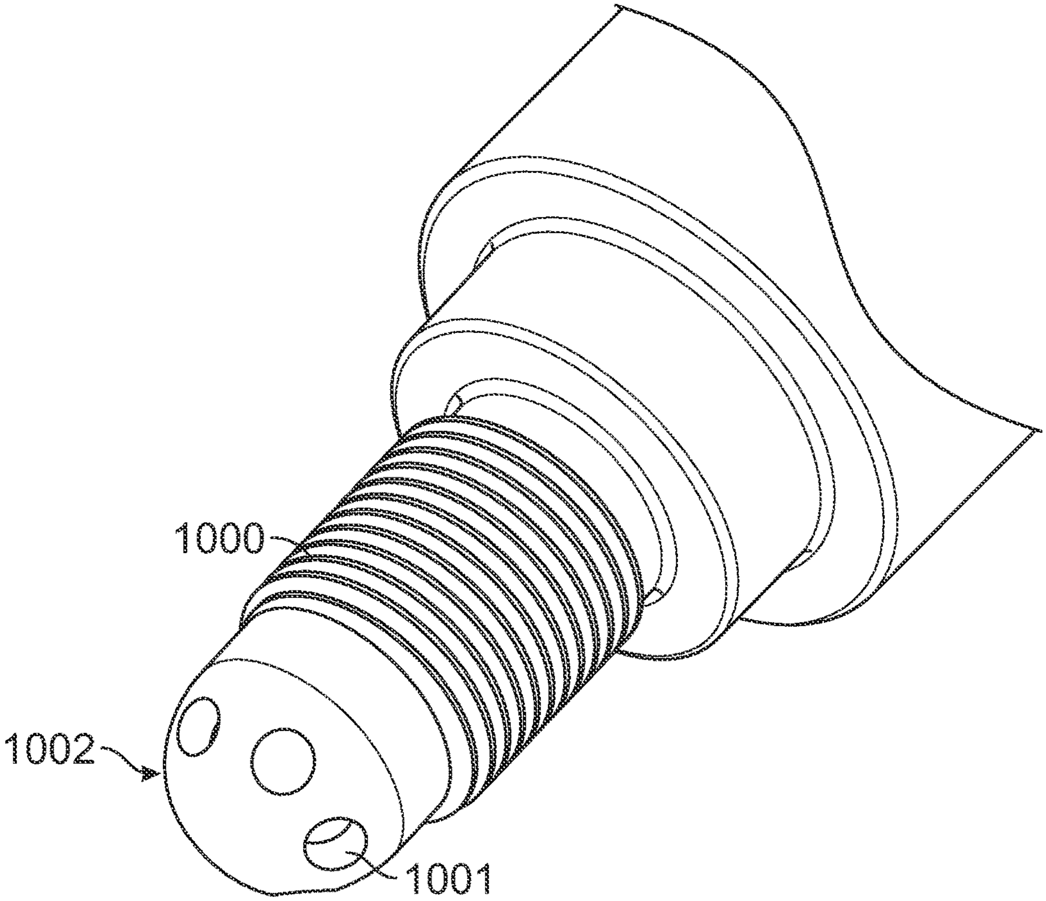
FIG. 10 is a perspective view of an embodiment of a nozzle to use in embodiments of pre-chamber assemblies in accordance with the present inventions.
Figure 10A:
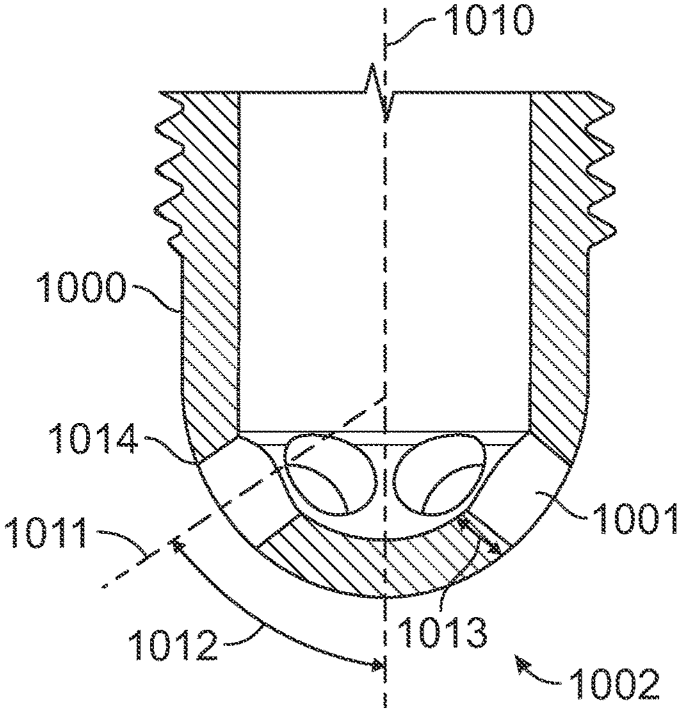
FIG. 10A is a cross-sectional view of the nozzle of FIG. 10

In FIGS. 10 and 10A there is shown a prospective view and cross-sectional view (respectively) of a nozzle 1000, the nozzle has an orifice that is made up of 6 holes, e.g., 1001, located around the end or tip 1002 of the nozzle. The holes have a diameter of 3 mm. The diameter of the holes can be about 2.3 mm, about 2.7 mm, about 3 mm, about 3.3 mm and can be from 2.5 mm to 3.1 mm in diameter. Depending upon the size and shape of the nozzle, and number of holes in the nozzle, larger diameter holes may be used. Smaller diameter holes may also be used. The holes all be the same diameter or they can be different diameters.

These nozzles have a central axis and their holes have a central axis. The angle formed between the nozzle's axis and the hole's axis is referred to as the "jet cone angle", as it in part defines the direction of the jet of hot gases that exits the nozzle and flow into the main chamber of the engine. The jet cone angle can be greater than 40°, less than 55°, about 35°, about 40°, about 45°, about 50°, about 55°, about 60°, from 35° to 60°, from 40° to 50°, as well as, larger and small angles. Generally, the jet cone angle for each hole in a nozzle is the same, the angles can be different and vary from hole to hole, or alternate from hole to hole (e.g., hole one is 40°, hole two is 50°, hole three is 40°, hole four is 50°, etc.).

Thus, by way of example, turning to FIG. 10A, there is shown the axis of the nozzle 1010 and the axis of a hole 1011. The jet cone angle is shown by arrow 1012.

Additionally, the shape of the tip of the nozzle can be varied. In the embodiments of FIGS. 9 and 10 the nozzle tip is hemispherical. This shape can be varied depending upon the number of holes, the diameter of the holes and the jet angle, to determine an optimum configuration for a particular main combustion chamber.

The tip of the nozzle also has a thickness, shown for example by arrow 1013. The thickness of the nozzle thus defines the length of the hole. The thickness of the nozzle and thus the length of the hole can help define the properties of the jet. Typically, the thickness of the nozzle and the length of the holes can be about 1 mm, about 1.5 mm, about 2 mm, and about 3 mm, from 1.2 mm to 3.2 mm, as well as, larger and smaller values. The out edge 1014 of the holes are shown as having a shape (e.g., 90°) edge. Conical opening, tapered openings and other types of opening for the outer edge of the hole are also contemplated.

The nozzle tips can be made from various coated or uncoated metals, as well as ceramics.

In determining the number of holes and their diameter, there should be sufficient material maintained between the holes to preserve the nozzle durability.

Typically, the nozzles are not liquid cooled. In embodiments they can be cooled. Thus, the thickness and composition of the nozzle and in particular the nozzle type, should be sufficient to resist and preventing melting of the nozzle, as well as, eliminating the need to cool the nozzle.

Thus, in any of the embodiments of the pre-chambers, including the Examples, these various parameters of the nozzle design can be used.

Example 9

Figure 11:
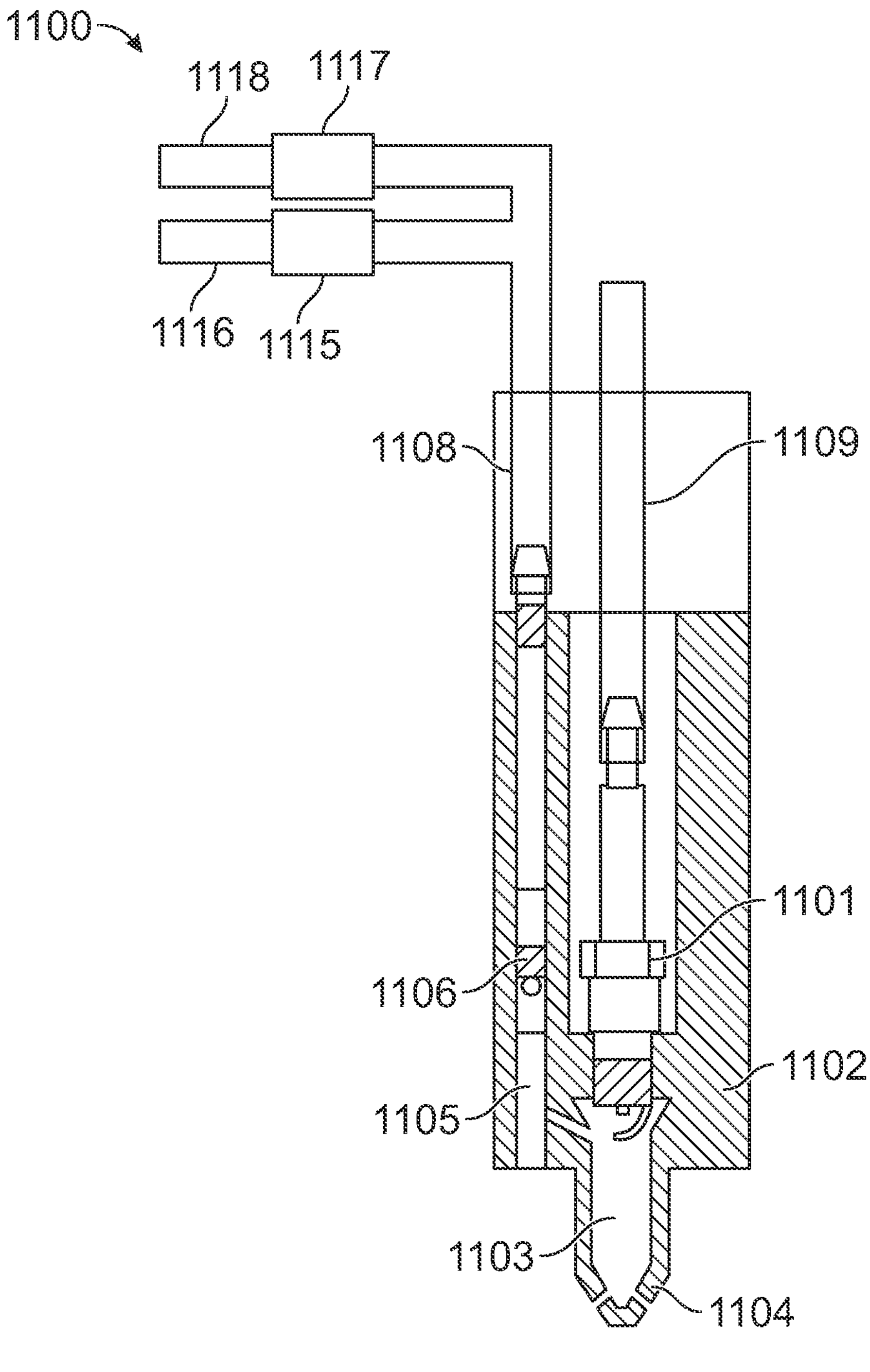
FIG. 11 is a cross-sectional view of an embodiment of a pre-chamber assembly for use with an engine in accordance with the present inventions.

Turning to FIG. 11, there is shown a cross section of pre-chamber assembly 1100, having a pre-chamber 1103 and a prechamber body 1102. The prechamber 1103 is formed in the prechamber body 1102 and has spark plug 1101, with spark plug wire 1109. The nozzle orifice 1104 (e.g., the nozzle holes) connects the prechamber 1103 with the main chamber of a spark ignition engine (not shown).

The prechamber assembly 1100 can be installed in, or is a part of, the cylinder head. In this embodiment, for example, the prechamber assembly 1100 and more preferably the pre-chamber body 1102, for example, can be threaded into, formed as an integral part of, welded into, squeeze fit into, etc., the cylinder head. The pre-chamber assembly 1100 can also be a separate body, or installed in a separate body, from the cylinder head, and this separate body would preferably be attached to, or joined with, the cylinder head. The prechamber assembly can be installed at any angle with respect to the cylinder head.

The assembly 1100 has an air supply line 1116, having valve 1115 than connects to conduit 1108. The assembly 1100 has a fuel supply line 1018 having valve 1117, that also connects to conduit 1108, thus providing for the mixing of the added air and fuel. Conduit 1108 has a valve 1106, e.g., a check valve. Conduit 1108 connects to passage 1105 which leads into chamber 1103.

In this manner fuel, and in particular a fuel air mix, is injected directly into the pre-chamber. An injector or other type of device to add material to the chamber could have been used in the place of the valve 1106.

In the embodiment of FIG. 11 the fuel and air are mixed before the valve or injector. It is understood that an entirely separate line and valve/injector could be used to inject the fuel directly into the chamber. Thus, in this embodiment there would be two additional systems for the chamber, one system to add additional oxidation source gases, e.g., air, oxygen, combination of these, into the pre-chamber 1103 and one system to add the fuel to the pre-chamber 1103.

In this embodiment, these same pre-chambers could be installed in multiple cylinders of a multi-cylinder engine, and then controlled to run different fuel-to-air equivalence ratios and different loads. Further engine hardware and software modifications could allow some cylinder(s) to operate near stoichiometric conditions or lean, to produce shaft power, while other cylinders could be run fuel rich, to produce synthesis gas. The exhaust of the cylinders producing synthesis gas could be divorced from the other cylinders, to facilitate easier harvesting of the exhaust gasses

Example 10

Figure 12:
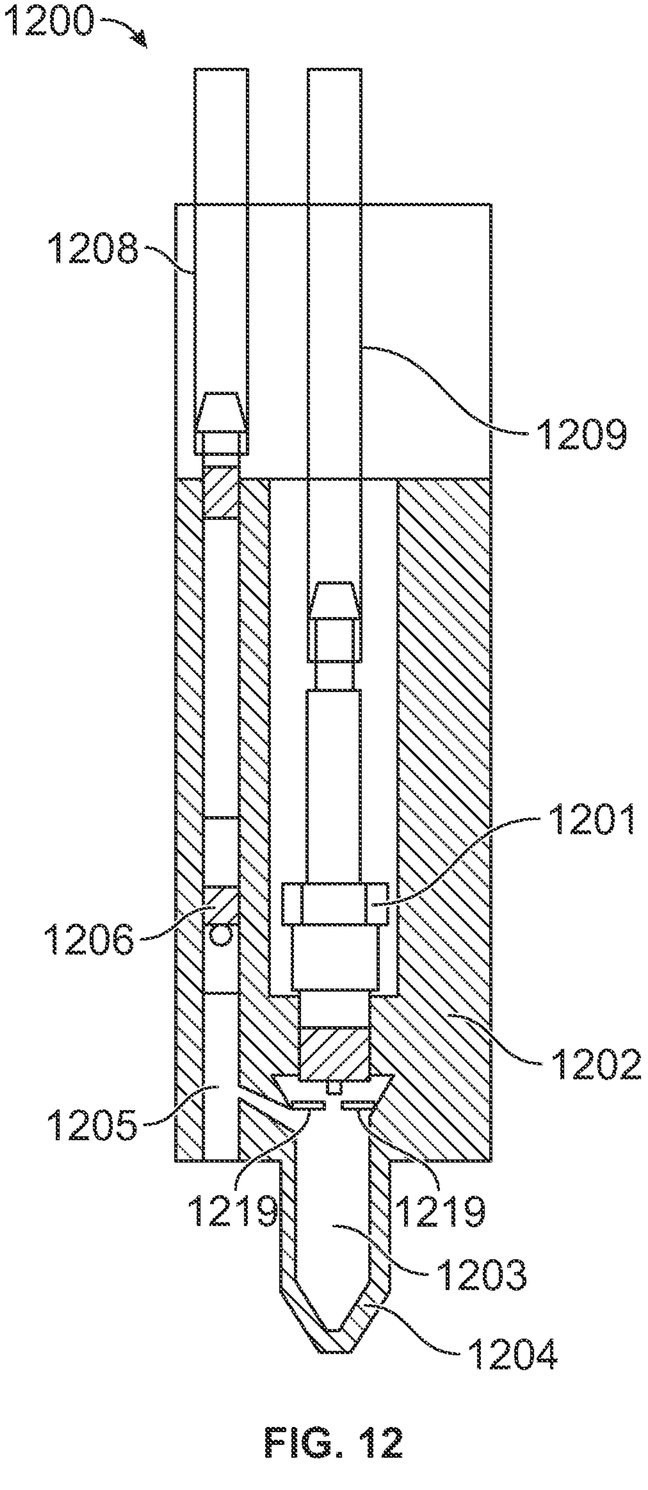
FIG. 12 is a cross-sectional view of an embodiment of a pre-chamber assembly for use with an engine in accordance with the present inventions.

Turning to FIG. 12, there is shown a cross section of pre-chamber assembly 1200, having a pre-chamber 1203 and a pre-chamber body 1202. The pre-chamber 1203 is formed in the pre-chamber body 1202 and has spark plug 1201, with spark plug wire 1209. The nozzle orifice 1204 (e.g., the nozzle holes) connects the pre-chamber 1203 with the main chamber of a spark ignition engine (not shown).

The pre-chamber assembly 1200 can be installed in, or is a part of, the cylinder head. In this embodiment, for example, the pre-chamber assembly 1200 and more preferably the pre-chamber body 1202, for example, can be threaded into, formed as an integral part of, welded into, squeeze fit into, etc., the cylinder head. The pre-chamber assembly 1200 can also be a separate body, or installed in a separate body, from the cylinder head, and this separate body would preferably be attached to, or joined with, the cylinder head. The pre-chamber assembly can be installed at any angle with respect to the cylinder head.

The assembly 1200 has a system to add additional oxidation source gases, e.g., air, oxygen, combination of these, into the pre-chamber 1203, having a supply conduit 1208 and a valve 1206, e.g., a check valve. The conduit 1208 is connected to passage 1205 which in turn connects to the chamber 1203. The valve can be an injector or type of device to add additional material to the chamber.

The spark plug ground straps 1219 are manufactured as part of the pre-chamber 1203, instead of being a part of the spark plug 1201 itself. One or more, and preferably multiple straps could be manufactured integral to the pre-chamber, to extend spark plug service life as ground straps erode or otherwise fail. The pre-chamber nozzle holes can also be sized small enough to prevent a broken ground strap from escaping the pre-chamber and then damaging the main cylinder and other engine components. Liquid cooling of the pre-chamber body will also help ground strap durability by reducing the metal temperature. The ground strap could be manufactured in one piece with the pre-chamber body, to eliminate any durability issues from welding on a separate ground strap to the pre-chamber, or the ground strap could be welded, as is the case with traditional spark plug manufacturing.

Example 11

For the present embodiments of rich limit extenders (including pre-chambers) and combinations of rich limit extenders and spark ignition engines, the pressure of the air (or air-oxygen mix, or oxygen) actively injected into the pre-chamber is elevated such that the air can be injected when the main chamber piston is near TDC (Top Dead Center). When the air is injected at lower pressures, mainly during the intake stroke, the compression stroke forces the fuel-rich mixture in the main chamber into the pre-chamber, thus decreasing the influence of the air injection in the final fuel-to-air equivalence ratio in the pre-chamber, and decreasing the rich operating limit. This embodiment overcomes this challenge by injecting the air at or near the end of the compression stroke, which would displace the rich mixture in the pre-chamber with air and lower the fuel-to-air equivalence ratio just before ignition, thus creating a more ideal environment for spark kernel development and flame propagation. This extends the rich operating limit of the engine, as the pre-chamber will not only combust at higher main chamber fuel-to-air equivalence ratios, but also the jets transferred to the main chamber will contain more energy and light richer main chamber mixtures as well.

Example 12

Pre-chambers of varying geometry and configuration were fabricated and tested in the engine, to study their impact on the rich limit of the engine, as a function of pre-chamber nozzle geometry, ignition timing and energy, air injection pressure, and air injection check valve design.

Generally, it is more difficult to impact the fuel-air-equivalence ratio in a chamber by injecting a small amount of air into a fuel rich mixture then it is to impact the air fuel equivalence ratio by injecting a small amount of fuel into a fuel lean mixture. It is theorized that this is because the air-to-fuel ratio (AFR) even in a rich engine is nearly 10, which means that approximately 10 times the mass of air must be injected into a rich mixture to get the same shift in fuel-air-equivalence ratio as you see in the change in air-fuel-equivalence ratio form injecting a given amount of mass of fuel into a lean mixture.

Embodiments of the pre-chambers were tested and provided a surprisingly large rich limit extension compared to the baseline spark ignition system. The tests were carried out with the same intake and exhaust conditions for each configuration, and a sweep of fuel-to-air equivalence ratio (ϕ) was conducted. Steady state data was taken during the sweep and the engine average coefficient of variation indicated mean effective pressure (COV of IMEP) was used to monitor combustion stability and misfires. Data was not collected after COV of IMEP exceeded the maximum acceptable value of 5%, so the richest data point shown represents the rich operating limit of the engine.

Figure 13:
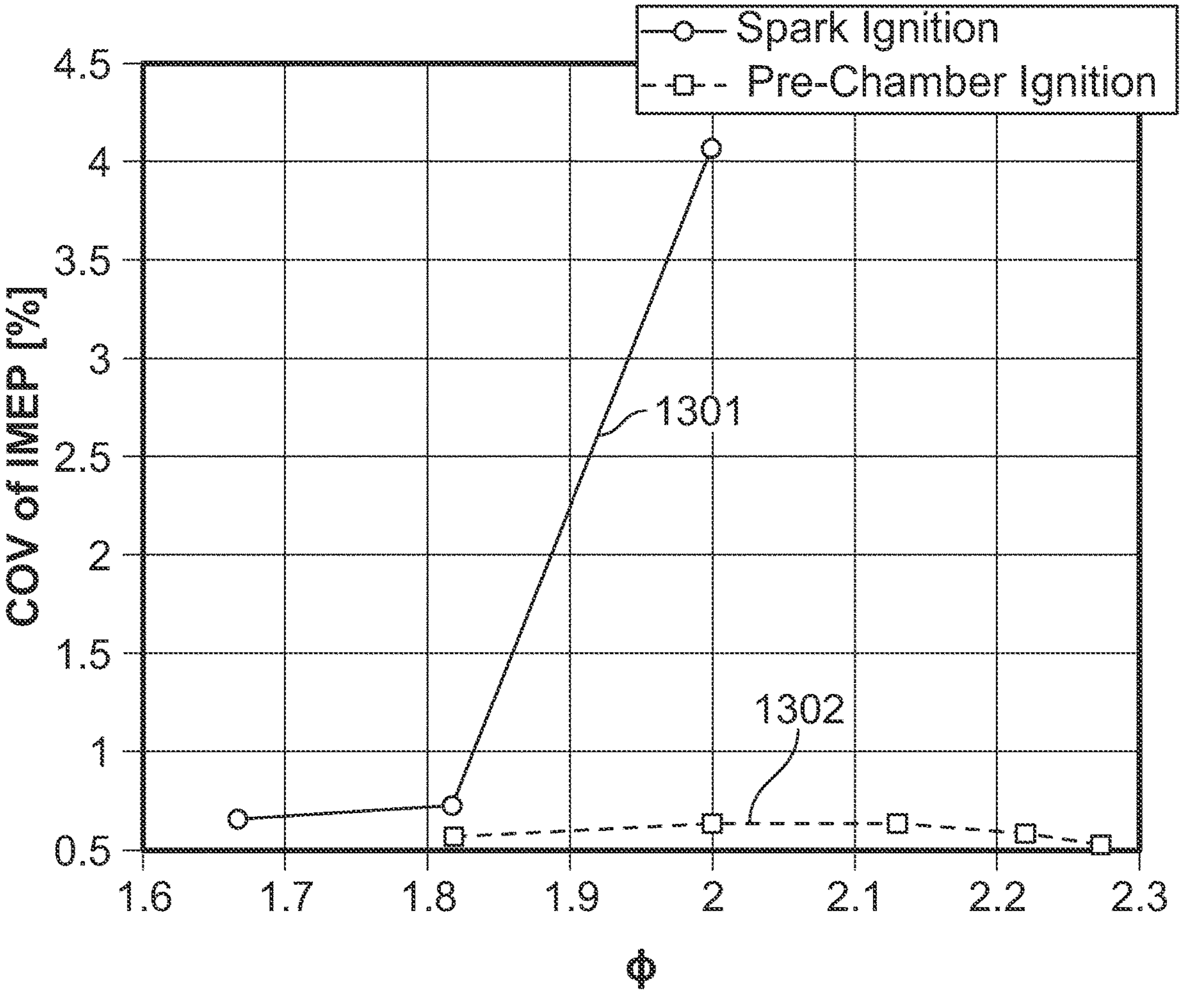
FIG. 13 is a chart showing COV of IMEP of conventional and an embodiment of a pre-chamber ignition systems in accordance with the present inventions during a fuel-to-air equivalence ratio sweep.

Turning to FIG. 13 there is shown a graph of COV of IMEP vs (ϕ) comparing a conventional spark ignition engine (line 1301) with the same type of engine having a pre-chamber assembly (line 1302) over the range of 1.65 to 2.27. The pre-chamber assembly used in this test had a configuration of the general type shown in FIG. 4, in this embodiment the prechamber was threaded into existing spark plug installation threads in the cylinder head and had eight holes in the nozzle, having a diameter of 2.0 mm and positioned at a jet angle of 55°.

The test, and data on FIG. 13, shows that the rich limit of the engine when using the pre-chamber assembly was extended to a fuel-to-air equivalence ratio of 2.27, which is an improvement of 0.27 over the baseline spark ignition system.

Figure 14:
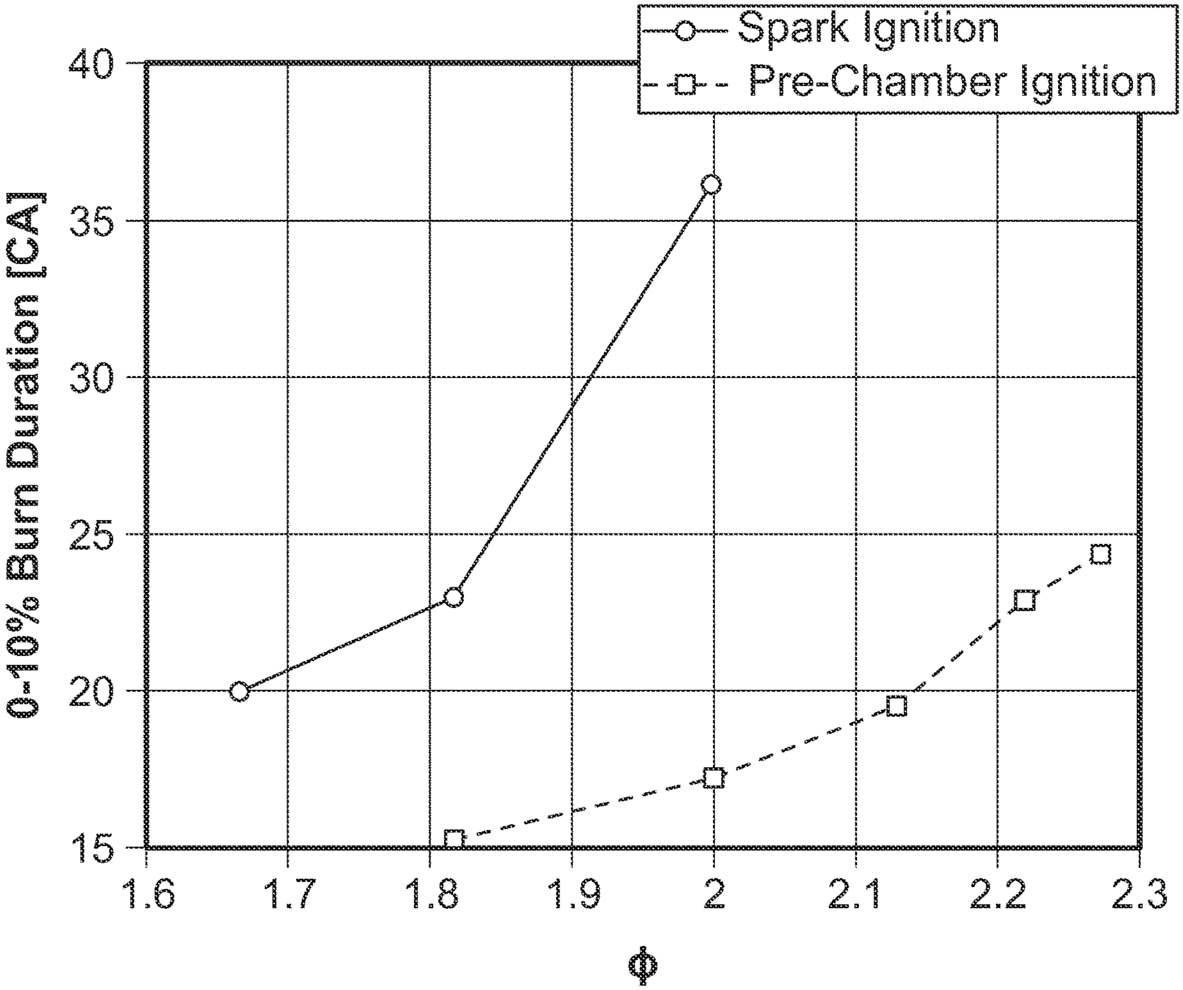
FIG. 14 is a chart showing 0-10% burn duration of pre-chamber vs baseline ignition system of conventional and an embodiment of a pre-chamber ignition systems in accordance with the present inventions during a fuel-to-air equivalence ratio sweep.
Figure 15:
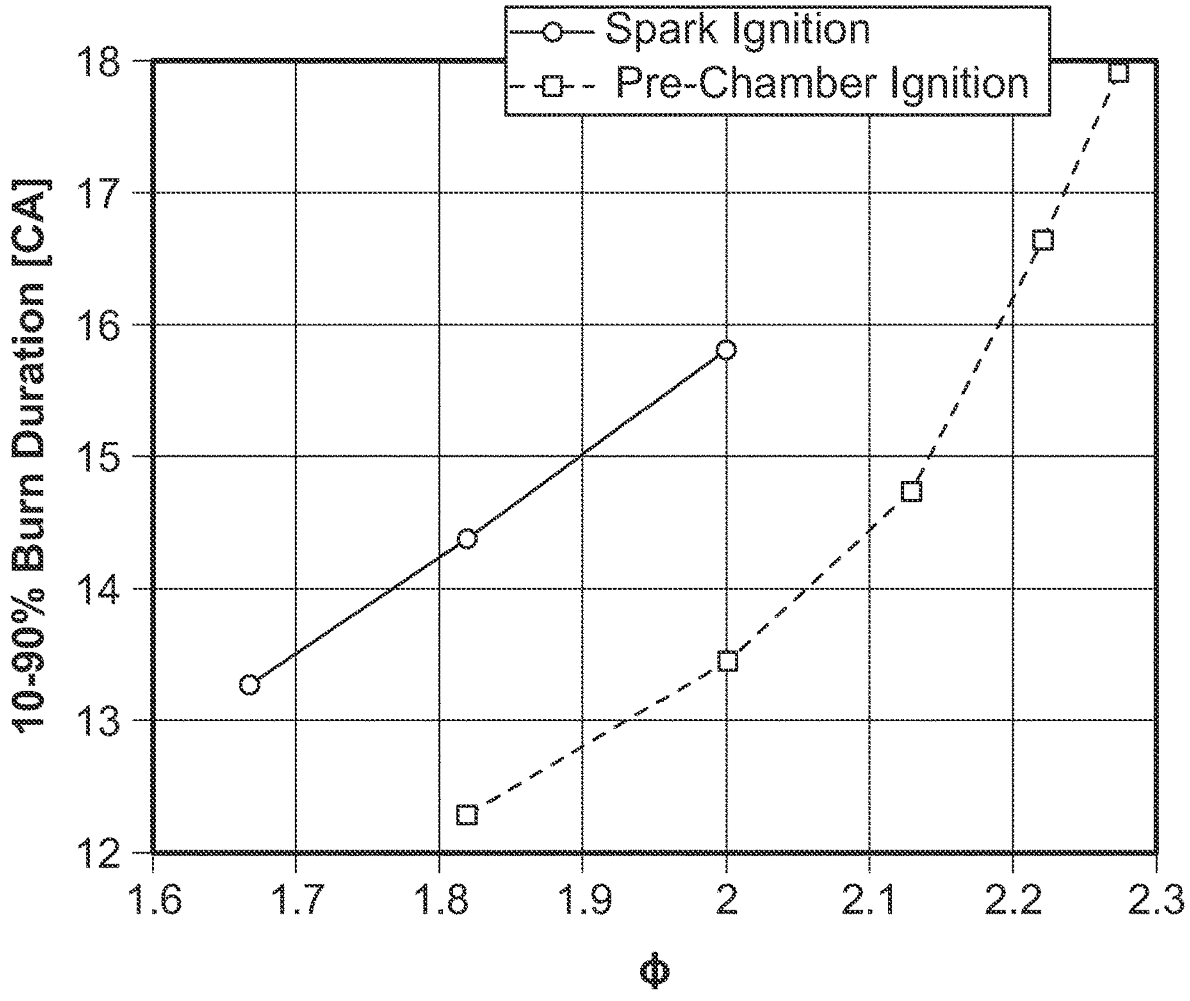
FIG. 15 is a chart showing 10-90% burn duration of pre-chamber vs baseline ignition system of conventional and an embodiment of a pre-chamber ignition systems in accordance with the present inventions during a fuel-to-air equivalence ratio sweep.

The pre-chamber assembly has a beneficial impact on the burn rates of the main chamber, especially in the early phases of combustion, as shown in FIGS. 14 and 15. The tests and data for FIGS. 14 and 15 were obtained using the same engine and engine with pre-chamber assembly as used for FIG. 13. It is theorized that this impact from the use of the pre-chamber on main chamber burn rates is because after the mixture in the pre-chamber ignites, hot jets of combustion gasses and flames are distributed through the main chamber, which leads to a much faster burn than the baseline spark ignition kernel development process.

Example 13

The systems of any of the embodiments of the present rich limit extenders, including embodiments of the pre-chamber assemblies, are combined with spark ignition engines, including any of the examples, and used as a reformer in, and thus as a part of, the GTL systems and methods disclosed and taught in U.S. patent application Ser. Nos. 17/746,942 and 17/953,056 and PCT application serial numbers PCT/US2022/029708 and PCT/US2022/044724, the entire disclosure of each of which is incorporated herein by reference.

Example 14

Figure 16:
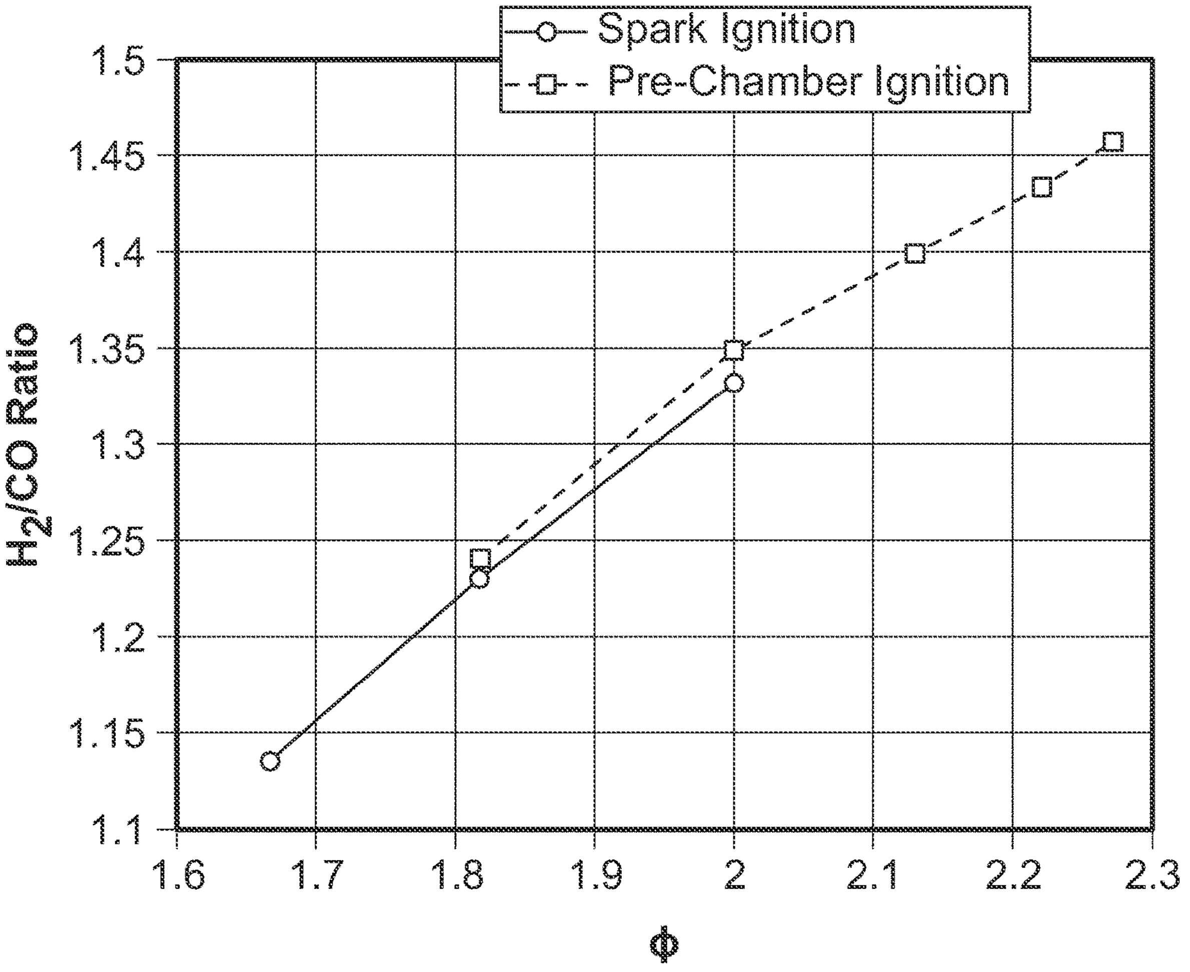
FIG. 16 is a chart showing $H_2/CO$ ratio of exhaust with pre-chamber vs baseline ignition system of conventional and an embodiment of a pre-chamber ignition systems in accordance with the present inventions during a fuel-to-air equivalence ratio sweep.

As set forth in Example 13, and elsewhere in this specification, the spark-ignition engines having a rich limit extender, e.g., a pre-chamber assemblies, find application in the production of syngas, for use, among other things, in the conversion of flare gas to a useful product, such as methanol. The quality of the synthesis gas produced by the reformer in these systems (e.g., GTL systems) is commonly quantified by analyzing the $H_2/CO$ ratio of the synthesis gas, with a higher ratio (more Hydrogen) being preferred. FIG. 16 shows that the using the same engine and engine with pre-chamber assembly as used for FIG. 13 improves the quality of the syngas simply by extending of the rich operating limit, as this generally leads to more hydrogen being present in the syngas.

Example 15

The systems of any of the embodiments where the components are configured and the system is operated in a net carbon-neutral manner.

Example 16

The systems of any of the embodiments where the components are configured and the system is operated in a manner that reduces the total carbon output from the waste gas sources.

It is noted that there is no requirement to provide or address the theory underlying the novel and groundbreaking production rates, performance or other beneficial features and properties that are the subject of, or associated with, embodiments of the present inventions. Nevertheless, various theories are provided in this specification to further advance the art in this important area, and in particular in the important area of hydrocarbon exploration, production and downstream conversion. These theories put forth in this specification, and unless expressly stated otherwise, in no way limit, restrict or narrow the scope of protection to be afforded the claimed inventions. These theories many not be required or practiced to utilize the present inventions. It is further understood that the present inventions may lead to new, and heretofore unknown theories to explain the conductivities, fractures, drainages, resource production, chemistries, and function-features of embodiments of the methods, articles, materials, devices and system of the present inventions; and such later developed theories shall not limit the scope of protection afforded the present inventions.

The various embodiments of devices, systems, activities, methods and operations set forth in this specification may be used with, in or by, various processes, industries and operations, in addition to those embodiments of the Figures and disclosed in this specification. The various embodiments of devices, systems, methods, activities, and operations set forth in this specification may be used with: other processes industries and operations that may be developed in the future: with existing processes industries and operations, which may be modified, in-part, based on the teachings of this specification; and with other types of gas recovery and valorization systems and methods. Further, the various embodiments of devices, systems, activities, methods and operations set forth in this specification may be used with each other in different and various combinations. Thus, for example, the configurations provided in the various embodiments of this specification may be used with each other. For example, the components of an embodiment having A, A' and B and the components of an embodiment having A", C and D can be used with each other in various combination, e.g., A, C, D, and A, A", C, D, and A', B, etc., in accordance with the teaching of this specification. Thus, the scope of protection afforded the present inventions should not be limited to a particular embodiment, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

What is claimed:

1. A device for extending the rich operating fuel limit of an engine, the device comprising:

a. a body defining a pre-chamber cavity;

b. an ignition source in communication with the pre-chamber cavity;

c. an inlet conduit, wherein the inlet conduit has a first end configured for receiving an oxidation source gas and a second end configured to provide the oxidation source gas to the pre-chamber cavity, and wherein the inlet conduit has a check valve located between the first end and the second end;

d. the pre-chamber cavity having a first end and a second end, wherein the second end has a nozzle having a plurality of holes; and, e. the body configured for attachment to an engine.

2. The device of claim 1, wherein the nozzle has 4 to 10 holes.

3. The device of claim 1, wherein the nozzle has 4 to 10 holes and one or more of the holes has a diameter from 1.2 mm to 3 mm.

4. The device of claim 1, wherein the combined area of the holes is about 5% to about 60% of the area of the nozzle.

5. A device for extending the rich operating fuel limit of an engine, the device comprising:

a. a body defining a pre-chamber cavity;

b. an ignition source in communication with the pre-chamber cavity;

c. an inlet conduit, wherein the inlet conduit has a first end configured for receiving an oxidation source gas and a second end configured to provide the oxidation source gas to the pre-chamber cavity;

d. the pre-chamber cavity having a first end and a second end, wherein the second end has a nozzle having a plurality of holes;

e. the body configured for attachment to an engine; and, f, wherein the inlet conduit has an injector located between the first end and the second end.

6. The device of claim 5, wherein the nozzle has 4 to 10 holes and one or more of the holes has a jet cone angle of from 30° to 80°.

7. The device of claim 5, wherein the nozzle has 4 to 10 holes and one or more of the holes has a diameter from 1.2 mm to 3 mm and one or more of the holes has a jet cone angle of from 40° to 60°.

* * * * *